US012794687B2

(12) United States Patent
Chau et al.

(10) Patent No.: US 12,794,687 B2
(45) **Date of Patent: *Nov. 10, 2026**

(54) TIME-AWARE BLOCKCHAIN STAGED REGULATORY CONTROL OF INTERNET OF THINGS DATA

(71) Applicants: AT&T Global Network Services Hong Kong LTD, Island East (HK); AT&T Mobility II LLC, Atlanta, GA (US)

(72) Inventors: Winnie Chau, Hong Kong (HK); John Philip Mulligan, Island South (HK); Shashi Gowda, Lantau Island (HK)

(73) Assignees: AT&T Mobility II LLC, Atlanta, GA (US); AT&T Global Network Services Hong Kong LTD, Island East (HK)

( * ) Notice: Subject to any disclaimer, the term of this patent is extended or adjusted under 35 U.S.C. 154(b) by 117 days.

This patent is subject to a terminal disclaimer.

(21) Appl. No.: 19/004,378

(22) Filed: Dec. 29, 2024

(65) Prior Publication Data

US 2025/0141678 A1 May 1, 2025

Related U.S. Application Data

(63) Continuation of application No. 17/841,881, filed on Jun. 16, 2022, now Pat. No. 12,184,774, which is a (Continued)

(51) Int. Cl.
*H04L 9/08* (2006.01)
*H04L 9/40* (2022.01)
*H04L 29/06* (2006.01)

(52) U.S. Cl.
CPC .......... *H04L 9/088* (2013.01); *H04L 63/0435* (2013.01)

(58) Field of Classification Search
CPC . H04L 9/088; H04L 63/0435; H04L 63/0428; H04L 63/062
See application file for complete search history.

(56) References Cited

U.S. PATENT DOCUMENTS

2021/0084470 A1* 3/2021 Chen .................. G06F 11/1451
2021/0218571 A1* 7/2021 Ansari ................ H04M 15/705

FOREIGN PATENT DOCUMENTS

WO WO2019233615 12/2019

OTHER PUBLICATIONS

U.S. Notice of Allowance dated Feb. 3, 2022 in U.S. Appl. No. 16/888,802.

(Continued)

*Primary Examiner* — Izunna Okeke
(74) *Attorney, Agent, or Firm* — Guntin & Gust, PLC; Andrew Gust

(57) ABSTRACT

The concepts and technologies disclosed herein are directed to time-aware blockchain staged regulatory control of Internet of Things ("IoT") data. A federation platform can receive a registration request from an enterprise edge platform to register a blockchain identifier for publication of public data on a public blockchain. The federation platform can determine if the registration request contains any restricted data parameters. In response to determining that the registration request does not contain any restricted data parameters, the federation platform can query a security module to obtain an encryption key. The federation platform can receive the encryption key from the security module and store the encryption key in association with the blockchain identifier and an enterprise edge platform ID that uniquely identifies the enterprise edge platform. The federation platform can (Continued)

return the encryption key to the enterprise edge platform and allow publication of encrypted public data to the public blockchain.

14 Claims, 23 Drawing Sheets

Related U.S. Application Data continuation of application No. 16/888,802, filed on May 31, 2020, now Pat. No. 11,374,746.

(56) References Cited

OTHER PUBLICATIONS

U.S. Notice of Allowance dated Aug. 19, 2024 in U.S. Appl. No. 17/841,881.

* cited by examiner

TIME-AWARE BLOCKCHAIN STAGED REGULATORY CONTROL OF INTERNET OF THINGS DATA

CROSS-REFERENCE TO RELATED APPLICATIONS

This application is a continuation of and claims priority to U.S. patent application Ser. No. 17/841,881, entitled "Time-Aware Blockchain Staged Regulatory Control of Internet of Things Data," filed Jun. 16, 2022, now allowed, which is incorporated herein by reference in its entirety and which is a continuation of and claims priority to U.S. patent application Ser. No. 16/888,802, entitled "Time-Aware Blockchain Staged Regulatory Control of Internet of Things Data," filed May 31, 2020, now U.S. Pat. No. 11,374,746, which is incorporated herein by reference in its entirety.

BACKGROUND

Enterprise-to-Enterprise data sharing can be complex in regions with highly regulated data governance guidelines. These regulatory guidelines, which can range from cybersecurity to restricted data to privacy and consent management, put a governance burden on both data publishers and data consumers. This burden is magnified in emerging technology solutions that involve large numbers of enterprises and ecosystem participants, some of whom may not have any direct business relationships with each other, such as, for example, a smart logistics solution that involves multiple enterprises across a large number of industry verticals. The regulatory challenge in large scale enterprise-to-enterprise data exchange frameworks can be broken down into two broad categories: data publishers and data consumers.

Currently, no viable market solutions exist for enterprise-to-enterprise data exchange frameworks which address this problem for blockchain technology. The immutable nature of blockchain complicates regulatory compliance because once data has been committed to a blockchain it cannot be altered or deleted without severely compromising the integrity of the distributed ledger itself. This immutability, which is a core value of all blockchain solutions, has a direct impact on data governability because regulations change over time. For example, data allowed today could be restricted tomorrow. A solution that does not allow restricted data to be deleted once committed to the ledger can be commercially challenging in highly-regulated regions around the world. Privacy and consent management add additional and significant complexity because consumers can arbitrarily invoke their right for data removal at any time. This level of data fluidity is antithetical to the core design principles of most commercially available blockchain solutions.

SUMMARY

The concepts and technologies disclosed herein are directed to time-aware blockchain staged regulatory control of Internet of Things ("IoT") data. According to one aspect disclosed herein, a federation platform can receive a registration request from an enterprise edge platform to register a blockchain identifier for publication of public data on a public blockchain. In some embodiments, the enterprise edge platform is a device gateway. In other embodiments, the enterprise edge platform is a third party gateway. The federation platform can determine if the registration request contains any restricted data parameters. In response to determining that the registration request does not contain any restricted data parameters, the federation platform can query a security module to obtain an encryption key. The federation platform can receive the encryption key from the security module. The federation platform can store the encryption key in association with the blockchain identifier and an enterprise edge platform ID that uniquely identifies the enterprise edge platform from which the registration request was received. The federation platform can return the encryption key to the enterprise edge platform.

The federation platform also can determine how the public data is to be encrypted. In some embodiments, the federation platform can determine that the public data is to be encrypted using an asymmetrical key pair, such as a private/public key pair. In other embodiments, the federation platform can determine that the public data is to be encrypted using a symmetrical key.

In some embodiments, the blockchain identifier is associated with a device. In some other embodiments, the blockchain identifier is associated with an asset.

In some embodiments, the federation platform can identify at least one restricted data parameter associated with the public data during a provisioning process. The provisioning process can associate at least one restricted data parameter with a timestamp to indicate when the public data is to be restricted. The restricted data parameter(s) can be updated over time. The restricted data parameter(s) can be associated with an updated timestamp that indicates a current time or a future time when restriction of the public data is to be enforced.

In some embodiments, the security module is part of the federation platform. In some other embodiments, the security module is a cloud-based security module that provides the encryption key as part of a cryptography key service.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
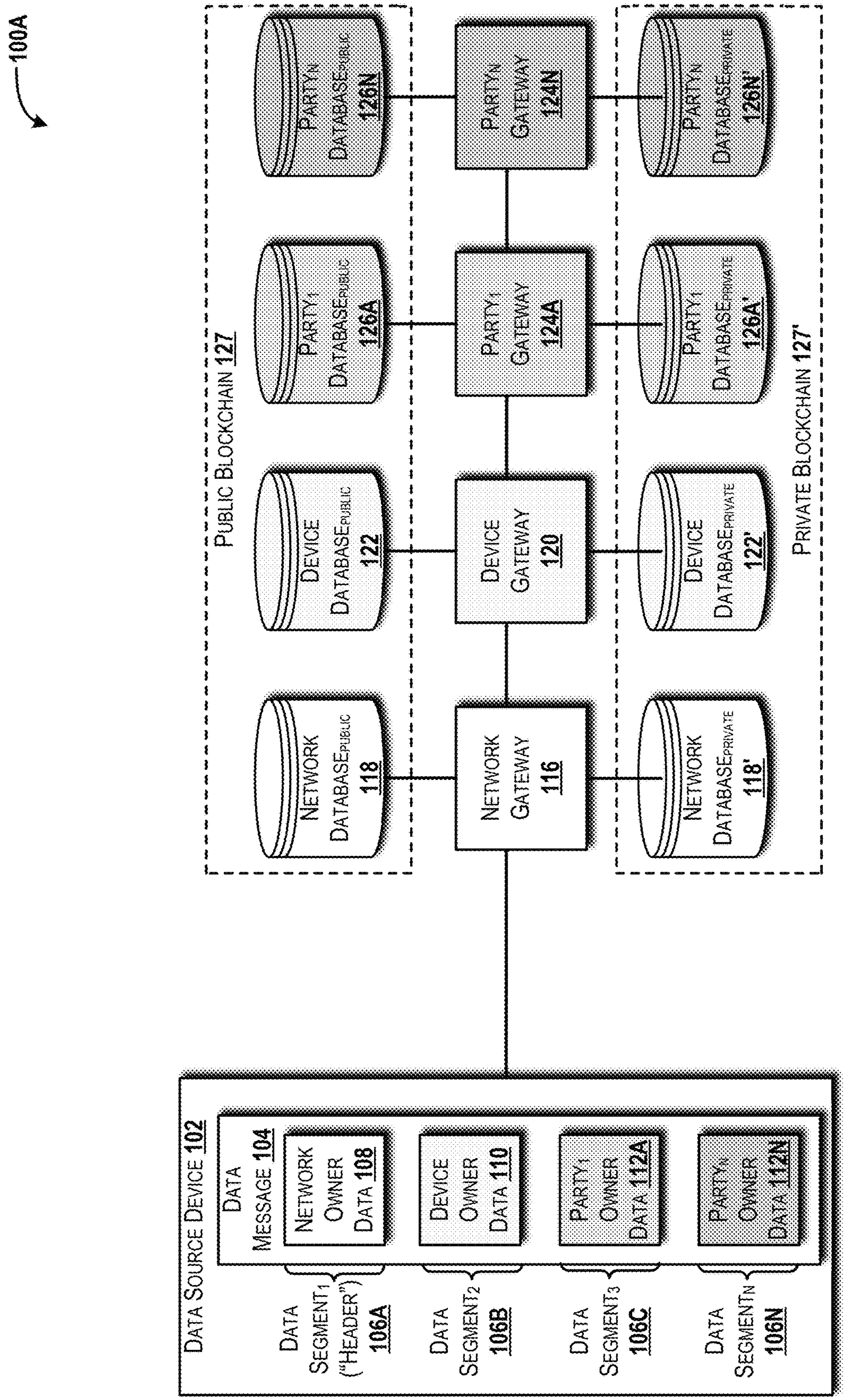
FIGS. 1A-1E are block diagrams illustrating aspects of an illustrative operating environment in which the concepts and technologies disclosed herein can be implemented.

The concepts and technologies disclosed herein overcome the aforementioned blockchain constraint while simultaneously firewalling service providers from any direct exposure to restricted or private data by creating a governance and exchange framework that requires no direct inspection or storage by the service provider of data being exchanged between ecosystem participants. The concepts and technologies disclosed herein provide an encryption architecture with a highly scalable and secure key generation mechanism, which allows for large scale data encryption and systematic data committal into the blockchain in a cryptographically unreadable format. This establishes a highly distributed multi-party-compute ("MPC") framework with participant anonymity. IoT data publishers are anonymously and cryptographically separated from data consumers.

The disclosed solution provides several significant and unique regulatory and governance benefits. All data is committed to a blockchain in an encrypted format and only the service provider and the data-publishing enterprise have the appropriate key(s) for decryption. Any consuming enterprise can request decryption key(s) for each individual blockchain transaction, and if denied that key, the enterprise will not have the ability to read IoT data within the blockchain transaction despite having direct access to the stored data. The disclosed solution also provides service providers with granular metering of data consumption on a per-enterprise, per-transaction basis. This capability gives the service provider the ability to audit, notify, and disclaim any consumption of retroactively restricted data, by any individual ecosystem participant, due to regulatory change, service integrity failure, or consumer privacy invocation. Moreover, the disclosed solution allows the service provider flexible revocation control over ecosystem integrity by providing data-consuming ecosystem participants with the ability to request key or asset removal from the blockchain for IoT data sources that directly violate service integrity, either through individual data points or collective data sets.

As countries globally implement cyber security laws, privacy guidelines, and encryption restrictions, it can be a tremendous burden for IoT device and platform providers to confidently deploy solutions for assets that cross national borders. By providing a secure protocol and regulator-aware middleware platform, telecommunications service providers, such as AT&T, are uniquely positioned to help both solutions providers and enterprises that require these solutions to be deployed with confidence. The concepts and technologies disclosed herein can allow telecommunications service providers, such as AT&T, to function as an "Ecosystem Facilitator," enabling unique IoT and emerging technology use cases with rapid transitions from proof of concept to operational support across a wide range of industries. The disclosed concepts and technologies address a void created by existing IoT solution providers and provide a solution that the market needs to accelerate innovation with an almost negligible risk to return on investment. The disclosed concepts and technologies will allow telecommunications service providers, such as AT&T, to foster and grow an ecosystem of device and systems integration partners across almost every emerging technology industry. For large, existing enterprise customers, this ecosystem will put telecommunications service providers, such as AT&T, in the position of picking the best-of-breed partners from across the ecosystem to solve critical customer needs rapidly and with a level of solution quality that competitive solutions will not be able to match.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of systems, devices, computer-readable storage mediums, and methods for time-aware blockchain staged regulatory of IoT data will be described.

Turning now to FIG. 1A, a block diagram illustrating an operating environment 100A in which the concepts and technologies disclosed herein can be implemented in accordance with exemplary embodiments is shown. The operating environment 100A includes a data source device 102 (also referred to herein, at times, as "device 102") that can create a multi-party data owner ("MPDO") data message 104 (hereinafter "data message 104") that contains a plurality of data segments 106A-106N (also referred to herein, at times, as "data segments 106"), each of which is owned by a different party. The data message 104 can be used to provide data to any number of parties. The term "owner," as used herein, is the party/entity within a data message flow that has proprietary ownership of one or more data segments 106 of the data message 104 generated by the data source device 102.

In the illustrated example, the data $\text{segment}_1$ 106A is owned by a network provider or network owner, and includes network owner data 108; the data $\text{segment}_2$ 106B is owned by a device manufacturer or device owner, and includes device owner data 110; and the data $\text{segment}_3$ through data $\text{segment}_N$ 106C-106N are owned by different third parties, and include $\text{party}_1$ owner data 112A and $\text{party}_N$ owner data 112N. The data source device 102 can provide an encrypted version (not shown) of the data message 104 to each owner in a sequence, and each owner can decrypt and consume the encrypted version of their respective data segment 106. For example, the data source device 102 can send an encrypted version of the data message 104 to a network gateway 116 that can decrypt the network owner data 108 in the data $\text{segment}_1$ 106A using its own decryption key (the various decryption keys also are not shown) and can store the decrypted version of the network owner data 108 in a network database 118. The network gateway 116, in turn, can provide a modified version of the encrypted version of the data message 104 (i.e., the encrypted version of the data message 104 with the network owner data 108 removed) to a device gateway 120 that can decrypt the device owner data 110 in the data $\text{segment}_2$ 106B via its own decryption key, and can store the decrypted version of the device owner data 110 in a device database 122. The device gateway 120, in turn, can provide a modified version of the encrypted version of the data message 104 (i.e., the encrypted version of the data message 104 with the network owner data 108 and the device owner data 110 removed) to a $\text{party}_1$ gateway 124A that can decrypt the $\text{party}_1$ owner data 112A in the data $\text{segment}_3$ 106C via its own decryption key, and can store the decrypted version of the $\text{party}_1$ owner data 112A in a $\text{party}_1$ database 126A. The $\text{party}_1$ gateway 124A, in turn, can provide a modified version of the encrypted version of the data message 104 (i.e., the encrypted version of the data message 104 with the network owner data 108, the device owner data 110, and the $\text{party}_1$ owner data 112A removed) to a $\text{party}_N$ gateway 124N that can decrypt the $\text{party}_N$ owner data 112N in the data $\text{segment}_N$ 106N via its own decryption key, and can store the decrypted version of the $\text{party}_N$ owner data 112N in a $\text{party}_N$ database 126N.

In some embodiments, the databases 118, 122, and 126A-126N can operate, at least in part, as part of a public blockchain 127 and a private blockchain 127'. In the illustrated example, each of the databases 118, 122, and 126A-126N are illustrated as having a public version (shown as databases 118, 122, and 126A-126N) and a private version (shown as databases 118', 122', and 126A'-126N'). The public versions are shown as part of the public blockchain 127. The private version are shown as part of the private blockchain 127'. In some embodiments, the private blockchain 127' is a sidechain of a main blockchain (e.g., the public blockchain 127).

It should be understood that ownership of the data does not need to be coextensive with ownership of particular device, system, gateway, platform, network element, or the like. For example, the network owner data 108 may be utilized by the network gateway 116, but the owner of the network owner data 108 may not actually own the network gateway 116. Instead, the network gateway 116 may be owned by some other entity and only authorized to handle the network owner data 108, such as part of a lease agreement, service agreement, or the like. For ease of description, however, ownership of the network owner data 108 and the network gateway 116 will be described as coextensive, and similarly, ownership of the device owner data 110 and the device gateway 120, ownership of the $\text{party}_1$ owner data 112A and the party gateway 124A, and ownership of the $\text{party}_N$ owner data 112N and the party gateway 124N will each be described as coextensive. This should not be construed as being limiting in any way.

It also should be understood that the network gateway 116, the device gateway 120, the $\text{party}_1$ gateway 124A, the party gateway 124N, the $\text{party}_1$ database 126A, and the $\text{party}_N$ database 126N may be described, at times, as being located in a "home" or "visited" location. These elements are labeled differently in the drawings using the "home" or "visited" descriptor in subscript. In the specification, these elements are labeled using the "home" or "visited" descriptor for the network gateway 116, the device gateway 120, and so on. The numerals remain the same throughout with the addition of a letter to further distinguish between "home" and "visited." For example, the network gateway 116 introduced in FIG. 1A is introduced as a home network gateway 116A in FIG. 1C and a visited network gateway 116B in FIG. 1C.

Figure 15:
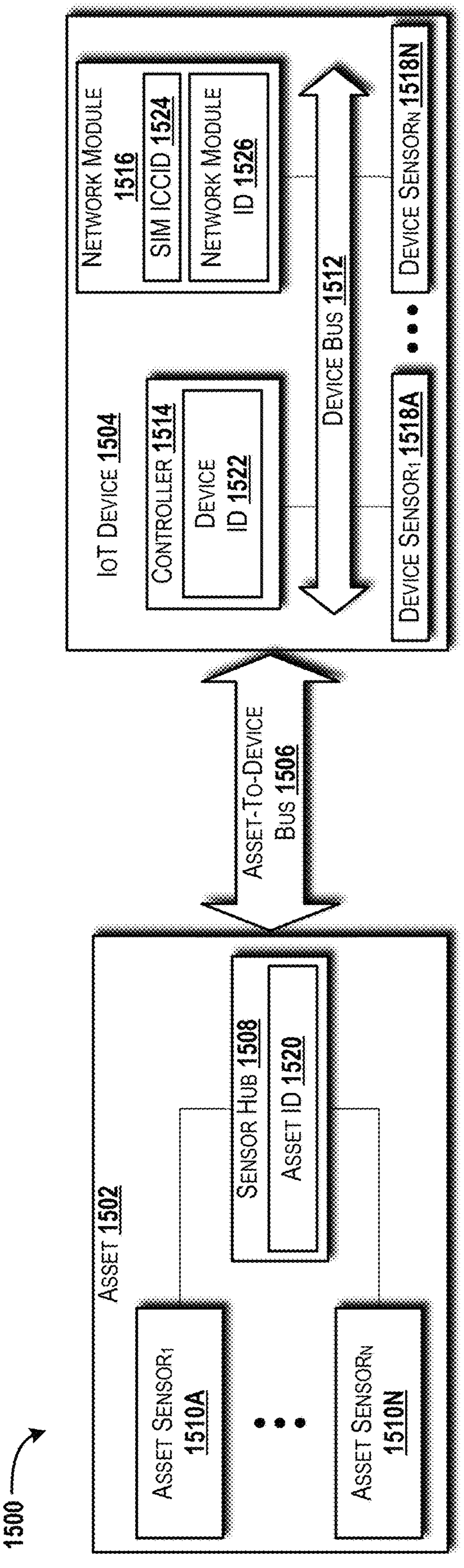
FIG. 15 is a block diagram illustrating aspects of an exemplary data source device implemented as a combination device (also referred to herein as "device+asset") that includes an asset and an IoT device, according to an illustrative embodiment.

The data source device 102 can be any type of device that is capable of generating and/or collecting data (e.g., from one or more sensors such as the sensors shown in FIG. 15). The data can be owned by a plurality of owners as described above. In some embodiments, the data source device 102 is or includes an IoT device, a non-limiting example of which is illustrated and described with reference to an IoT device 1504 in FIG. 15. The data source device 102 can be a non-programmable or programmable IoT device. In some embodiments, the data source device 102 is or includes a combination of an IoT device and an asset of some sort (e.g., the IoT device 1504 and an asset 1502 best shown in FIG. 15). An example of a combined IoT device and asset also is described with reference to FIG. 15 as a combination data source device 1500 (also referred to herein, at times, as a "device+asset").

An asset, such as the asset 1502 shown in FIG. 15, can be an autonomous agent that meets the definition of a "machine" in accordance with machine-to-machine ("M2M") standards. As such, the asset can be a computing element with a network interface. The asset alternatively can be or can include, but is not limited to, a product or good, a box that contains one or more products/goods, a cargo box that contains one or more products/goods, a pallet that contains one or more cargo boxes, a container that contains at least one pallet, or any other storage and/or shipping configuration. The type of asset should not be limited in any way. Other assets can be associated with smart technologies, such as smart buildings, smart cities, smart health, smart manufacturing, smart factories, and the like, among other concepts associated with the fourth industrial revolution (also known as "Industry 4.0"). In some instances, an asset can be an individual or group of individuals. The type of asset should not be limited in any way. Moreover, the industries to which the concepts and technologies disclosed herein may be applied should not be limited in any way.

The disclosed blockchain solution allows devices and assets to be provisioned separately. Each device and asset has a unique and anonymous blockchain identifier that is referred to herein as an "eAsset-ID." An eAsset-ID can be a number, letter, character, or any combination thereof that uniquely and anonymously identifies a device or asset within a blockchain network. Each device and asset also has an allocation of replenishable digital currency amounts that can be used within a blockchain network for creating digital transactions. eAsset-IDs can be created separately for both a public blockchain 127 and a private blockchain 127' (referred to herein, respectively as public eAsset-IDs and private eAsset-IDs). An eAsset-ID can represent either an IoT Device (e.g., the data source device 102 or the IoT device 1504) or an IoT Asset (e.g., the asset 1502) as described above. When a device or a device+asset generates IoT data, the transmission of that data costs some amount of digital currency. By spending this digital currency against the IoT device's eAsset-ID or the IoT asset's eAsset-ID, the blockchain ledger infrastructure incorporates the IoT data into the ledger along with the amount spent. This IoT data then becomes permanently stored within the distributed ledger, and referenced by the unique eAsset-ID allocated for the particular IoT device or IoT asset that generated the IoT data.

The data source device 102 can generate data for each party/data owner as the separate data segments 106A-106N. The data source device 102 can then perform a process to generate a hash of each of the data segments 106B-106N. The data source device 102 can create separate hashes for the device owner data 110, the party$_1$ owner data 112A, and the party owner data 112N. The data source device 102 also can create a hash of all data segments 106A-106N. The data source device 102 can generate these hashes using any hash function, including cyclic redundancy checks ("CRC") (e.g., CRC32), checksum functions, and cryptographic hash functions. After the data source device 102 generates the hashes, the data source device 102 can encrypt the data segments 106A-106N. The data source device 102 also can create a message footer (not shown) that includes a combination of the hashes.

The data source device 102 can then assemble the data message 104. The data segment$_1$ 106A can be or can include a message header to be used by the network gateway 116 for routing the data message 104, for example, to the network gateway 116, which can decrypt the network owner data 108 (e.g., routing data) using its own decryption key. The other parties can use their respective gateways 120, 124A, 124N to generate a new header to route the data message 104 to the next stop in the message flow sequence. The data source device 102 can add a message footer to the data message 104 to complete the message assembly process.

After the data message 104 is assembled, the data source device 102 can route the data message 104 to the network gateway 116. The network gateway 116 is the only entity along the data message flow that is allowed to intercept the data message 104 before the device owner (via the device gateway 120). In some embodiments, the network gateway 116 is a federation platform with each of the other gateways—for example, the device gateway 120, the party$_1$ gateway 124A, and the party$_N$ gateway 124N—operating as enterprise edge platforms ("EEP") individually owned by a different enterprise. The EEPs provide a hosted, enterprise-specific data exchange that functions as a bridge between a public blockchain and a private pegged side chain.

Each of the gateways 116, 120, 124A, 124N can receive the data message 104 in sequence of a data message flow, consume the routing header (e.g., the network owner data 108 for the network gateway 116, and a new routing header for each additional participating gateway in the sequence), use the respective keys to decrypt the respective data segments 106A-106N, and generate a hash (e.g., CRC32 or other described above) of the respective decrypted version of the data segments 106A-106N. Each gateway 116, 120, 124A, 124N can then acknowledge the data message 104 (e.g., via an ACK message), and can include the newly-generated hash in the ACK message. If a downstream party acknowledges the data message 104 with a hash, the data message 104 can be considered verified and can be passed to the next party upstream (e.g., the device gateway 120 to the party$_1$ gateway 124A, and so on in the sequence). The sequence can be determined by the device owner associated with the device gateway 120. In the illustrated example, the sequence of the network gateway 116 to the device gateway 120, the device gateway 120 to the party$_1$ gateway 124A, and the party$_1$ gateway 124A to the party$_N$ gateway 124N should not be construed as being limiting in any way.

Figure 1B:
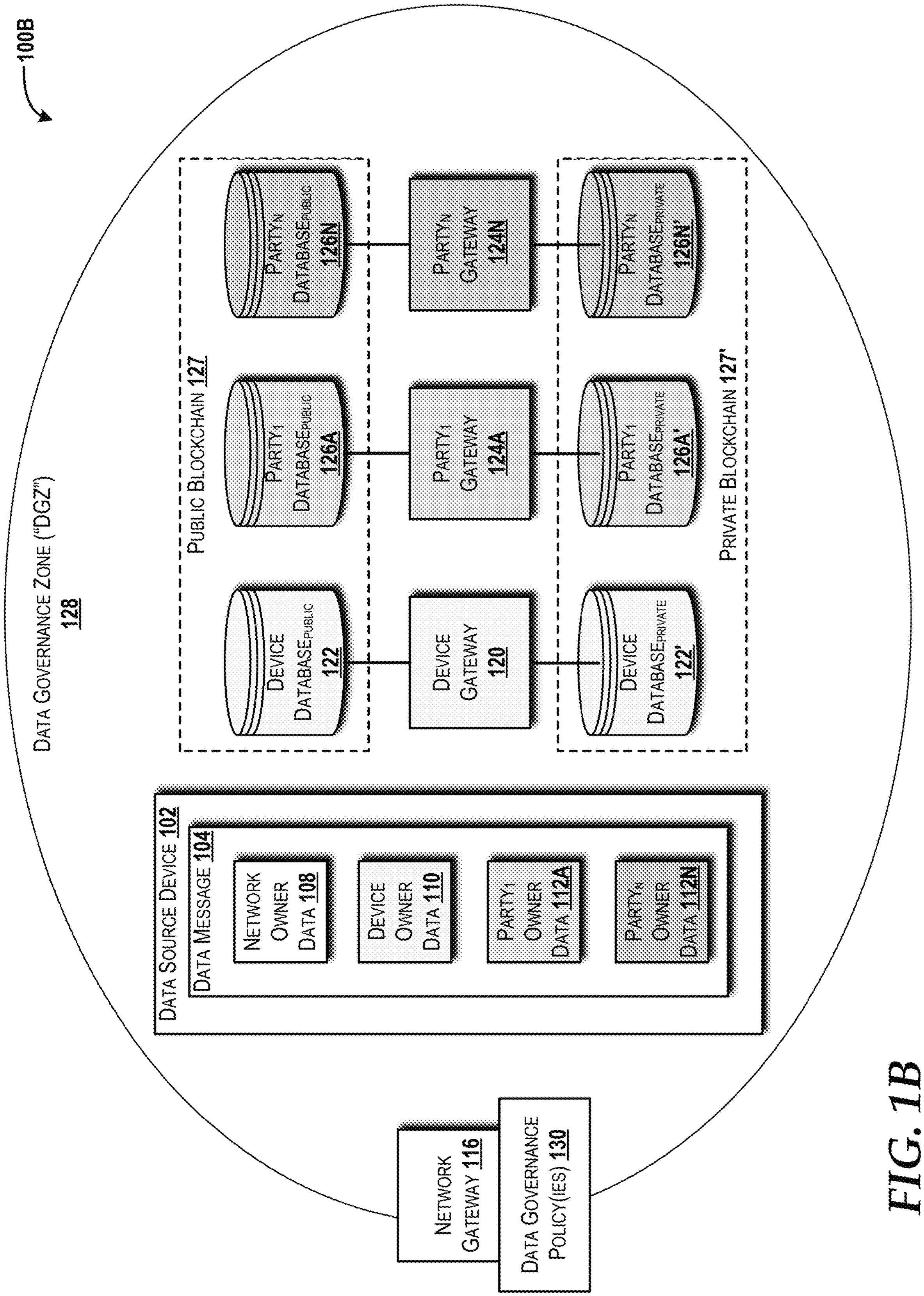

Turning now to FIG. 1B, an operating environment 100B shown with the data source device 102 operating within a data governance zone ("DGZ") 128 will be described, according to an exemplary embodiment. The DGZ 128 is a geographically-bounded region defined in accordance with one or more data governance policies 130. The data governance policies 130 can be based upon laws, regulations, executive orders, and/or other directives established by government, enterprise, individual, regulatory committee, bureau, agency, multiples thereof, combinations thereof, and/or the like. The data governance policies 130 can define the geographical scope of the DGZ 128. In addition, the data governance policies 130 can define the data (e.g., in terms of data type, source, destination, and/or other criteria) that can be exchanged within the DGZ 128, such as from the data source device 102 to the device gateway 120, the party$_1$ gateway 124A, and/or the party$_N$ gateway 124N.

In general, the data governance policy 130 can define the DGZ 128 as a geographical area of any size and shape. The geographical area may be contiguous, such as between two countries across a shared border. The geographical area may be noncontiguous. For example, a company may operate in multiple countries that do not share a border (e.g., United States and China), and as such, the DGZ 128 may be defined as the area within the national borders of each country. Moreover, one data governance policy 130 may define the DGZ 128 as a contiguous portion of supply chain, such as across the shared border between China and Kazakhstan, and also a noncontiguous portion defined as the area within the borders of the United States.

The DGZ 128 can be local, regional, or global. In some embodiments, the DGZ 128 follows an existing border that separates geographical areas such as towns, cities, counties, states, provinces, or countries. Alternatively, the DGZ 128 can be established for specific buildings or other places (e.g., outdoor venues). Moreover, the DGZ 128 can be established for specific entities such as a business, government, or law enforcement entity. The DGZ 128 can apply to specific industries that consider the data governance policies 130 from a plurality of sources along a supply chain (e.g., from manufacturing to shipping and to deployment.)

The DGZ 128 can be defined based upon an existing infrastructure such as a telecommunications or a utility infrastructure. A mobile network is one non-limiting example of an existing infrastructure upon which the DGZ 128 can be defined. The mobile network can be operated, at least in part, by one or more mobile network operators ("MNOs"). The mobile network can utilize a number of cell-sites that can be uniquely identified by cell-IDs. These cell-IDs can be used to define the geographical area encompassed by the DGZ 128. This can be particularly useful for noncontiguous DGZs 128, although contiguous DGZs 128 may also benefit from such definitions. A high-level example of a network that includes an example mobile/cellular network is illustrated and described herein with reference to FIG. 17.

The DGZ 128 can implement the network gateway 116 as the gate-keeper/entry point to the DGZ 128. As mentioned above, the network gateway 116 can enforce one or more of the data governance policies 130 to ensure the exchange of data within the DGZ 128 is in compliance.

Figure 1C:
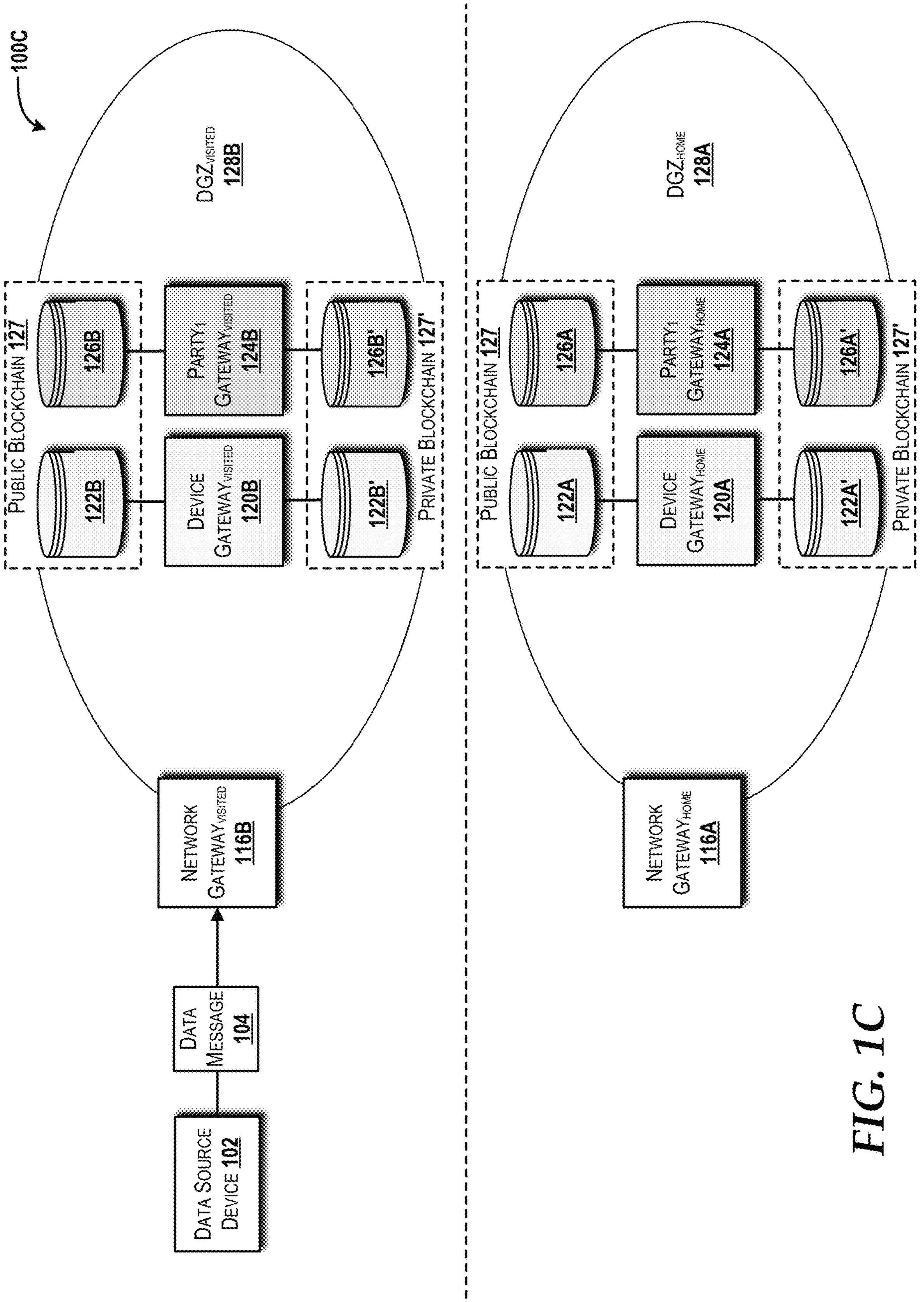

Turning now to FIG. 1C, an operating environment 100C shown in a configuration of the data source device 102 operating in communication with a visited network gateway 116B (illustrated as "network gateway$_{VISITED}$") for access to a visited DGZ 128B (illustrated as "DGZ$_{VISITED}$") will be described, according to an exemplary embodiment. The operating environment 100C also includes a home DGZ 128A (illustrated as "DGZ$_{HOME}$") accessed via a home network gateway 116A (illustrated as "network gateway$_{HOME}$"). The home DGZ 128A includes a home device gateway 120A (illustrated as "device gateway 120$_{HOME}$") and a home party gateway 124A (illustrated as "party$_1$ gateway$_{HOME}$"). These gateways operate in communication with corresponding databases, including a home device database 122A/122A' and a home party$_1$ database 126A/126A' operating in the public/private blockchain 127/127'. The visited DGZ 128B also includes a visited device gateway 120B (illustrated as "device gateway$_{VISITED}$") and a visited party$_1$ gateway 124B (illustrated as "party$_1$ gateway$_{VISITED}$"). These gateways operate in communication with corresponding databases, including a visited device database 122B/122B' and a visited party$_1$ database 126B/126B' operating in the public/private blockchain 127/127'.

Figure 1D:
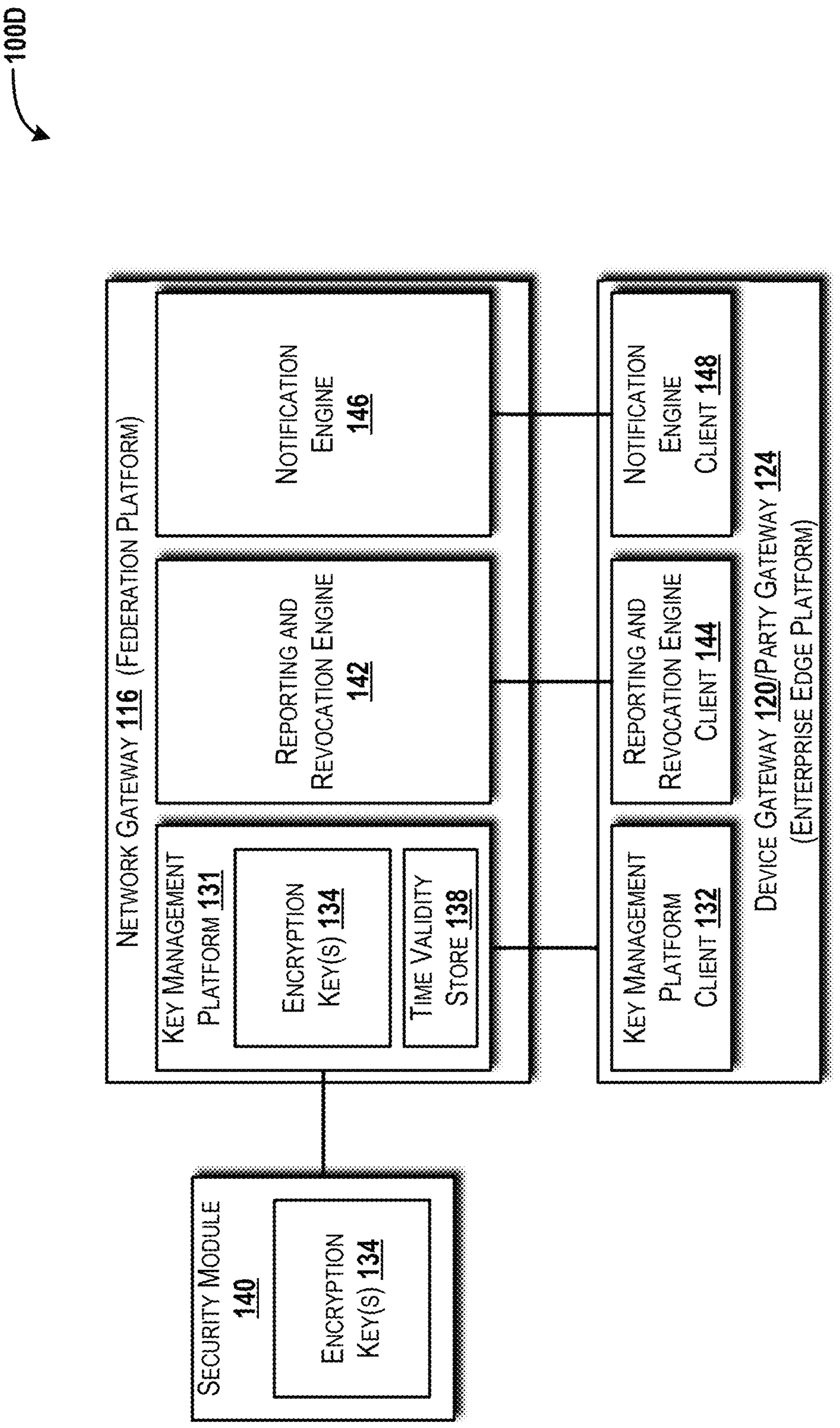

Turning now to FIG. 1D, an operating environment 100D shown with additional components of a federation platform, such as the network gateway 116, and an EEP, such as the device gateway 120 or one of the third party gateways 124, will be described, according to an exemplary embodiment. The device gateway 120 will be referenced as the EEP, but the same components can be implemented by the third party gateways 124.

The illustrated network gateway 116 includes a key management platform 131 that communicates with a key management platform client 132 of the device gateway 120 to provide cryptographic keys to the device gateway 120. In particular, the key management platform 131 can communicate with the key management platform client 132 to provide one or more encryption keys 134 for the device gateway 120 to use to encrypt and decrypt IoT payload data, such as IoT data contained in the data message 104 (best shown in FIG. 1A). The key management platform 131 can support two implementations for key management depending upon the sensitivity of the data involved. In particular, symmetrical keys can be used for IoT data associated with general IT services. This data can include public data that can be shared without restrictions. For highly-secure IoT services, such as those that produce IoT data that should only be made accessible to certain parties, the key management platform 131 can use asymmetrical keys. Additional details in this regard will be provided herein with regard to the handling of restricted and unrestricted data.

The key management platform 131 also can communicate with the key management platform client 132 to provide the encryption key(s) 134 for the device gateway 120 to use to decrypt the encrypted IoT payload data. The key management platform 131 also maintains a time validity store 138 for the encryption keys 134. The time validity store 138 stores time validity values that indicate a time window during which each of the encryption keys 134 are valid.

The key management platform 131 is illustrated as being in communication with a security module 140. The security module 140 can be or can include a hardware security module that generates the encryption keys 134. In some embodiments, the security module 140 is implemented as a service accessible by the key management platform 131. The service can operate on a cloud-based or centralized platform. Alternatively, the network gateway 116 can implement the security module 140 locally, such as part of the key management platform 131.

The illustrated network gateway 116 also includes a reporting and revocation engine 142. The reporting and revocation engine 142 can receive a report of IoT data issues from a reporting and revocation engine client 144 of the device gateway 120. The reporting and revocation engine 142 also can receive requests from the device gateway 120 to revoke devices.

A notification engine 146 is also shown as part of the network gateway 116. The notification engine 146 can communicate with a notification engine client 148 of the device gateway 120 to notify the device gateway 120 (or other target EEP) of reports submitted against devices and/or assets that the device gateway 120 serves. The notification engine 146 also can communicate with the notification engine client 148 to notify the device gateway 120 of revocation requests issued against the device gateway 120.

Figure 1E:
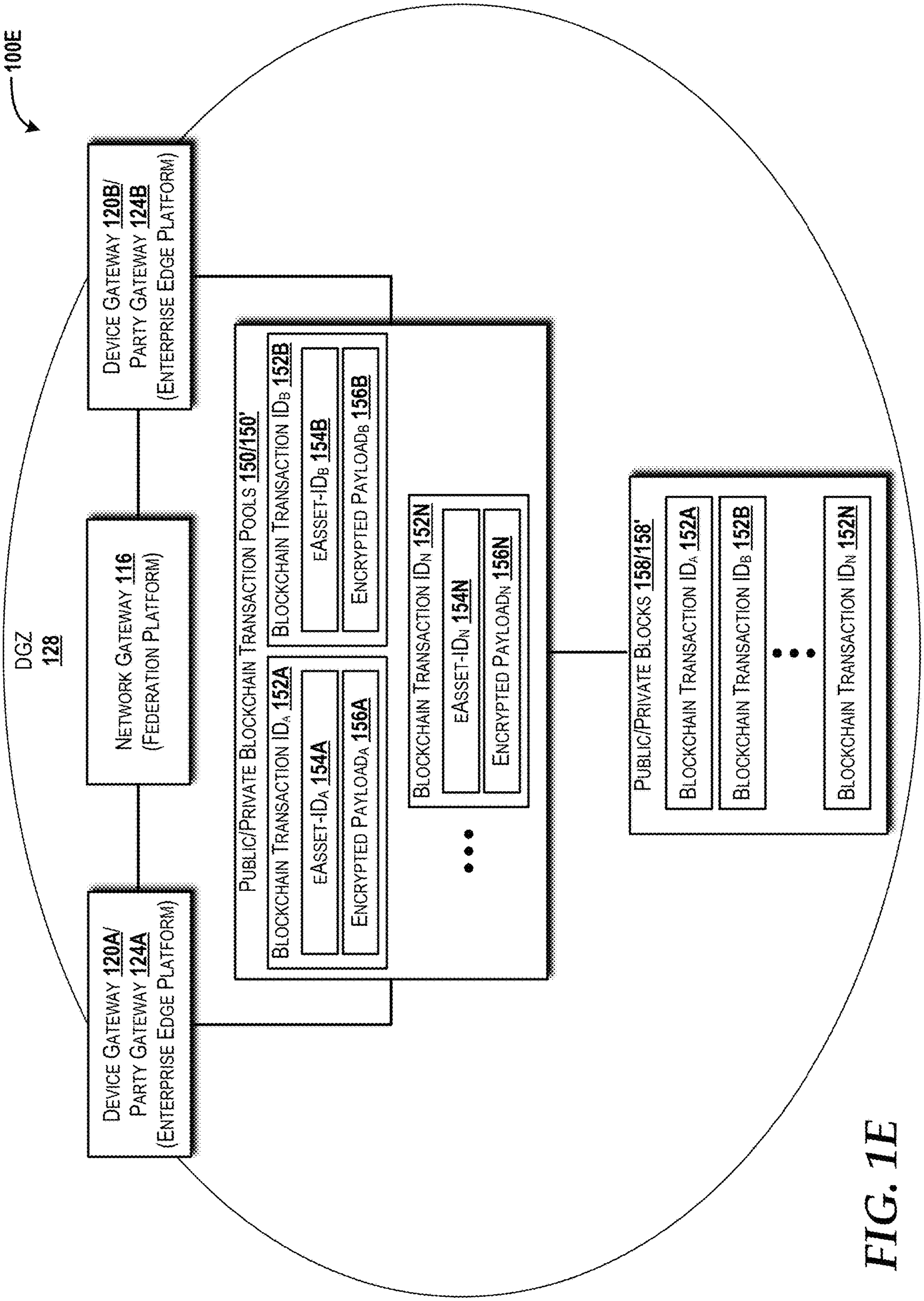

Turning now to FIG. 1E, an operating environment 100E that includes a public blockchain transaction pool (otherwise known as a "memory pool" or "mempool") 150 and a private blockchain transaction pool 150' will be described, according to an illustrative embodiment. The public blockchain transaction pool 150 is associated with the public blockchain 127. The private blockchain transaction pool 150' is associated with the private blockchain 127'. The operating environment 100E illustrates the DGZ 128, the network gateway 116 the device gateways 120A/120B, and the party gateways 124A/124B described above. The device gateways 120A/120B and the party gateways 124A/124B are shown in communication with the network gateway 116 and the blockchain transaction pools 150/150'.

Figure 10A:
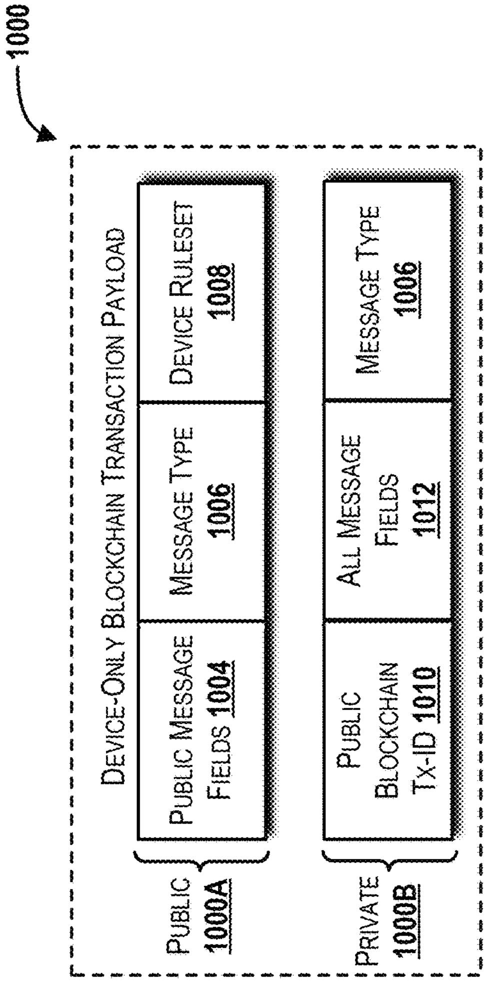
FIG. 10A is a block diagram illustrating aspects of a device-only blockchain transaction payload, according to an illustrative embodiment.
Figure 10B:
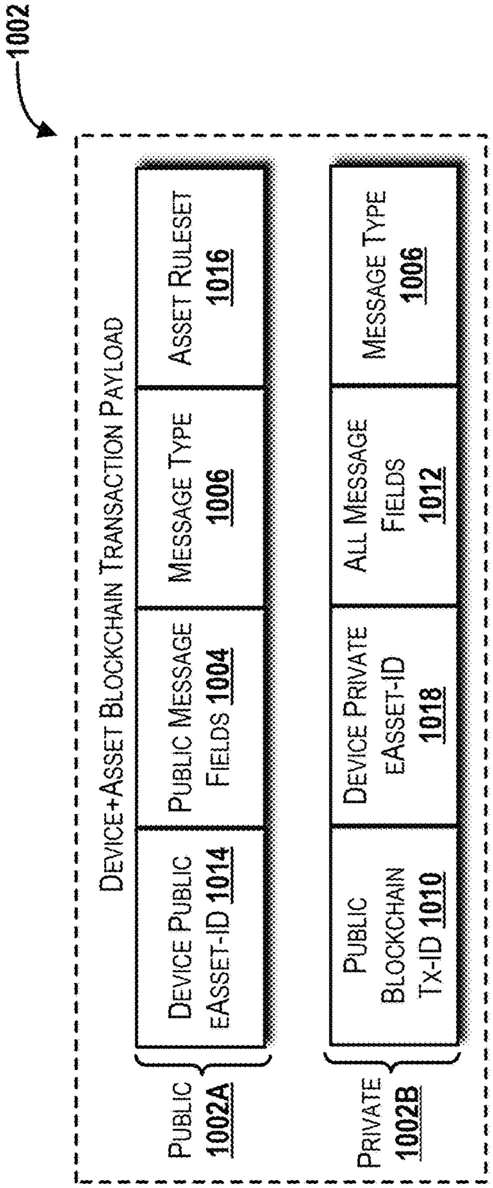
FIG. 10B is a block diagram illustrating aspects of a device+asset blockchain transaction payload, according to an illustrative embodiment.

All transactions on the public blockchain 127 within the DGZ 128 move through the public blockchain transaction pool 150. All transactions on the private blockchain 127' for each individual enterprise within the DGZ 128 move through the enterprise's instance of the private blockchain transaction pool 150'. Each blockchain transaction within the blockchain transaction pools 150/150' can be identified by a unique blockchain transaction ID 152A-152N. Each blockchain transaction can contain one or more eAsset-IDs 154A-154N and an encrypted payload 156A-156N. An example device-only blockchain transaction payload 1000 and an example device+asset blockchain transaction payload 1002 are shown in FIGS. 10A and 10B, respectively.

The illustrated example shows both blockchain transaction pools 150/150' including blockchain transactions associated with a blockchain transaction IDA 152A, a blockchain transaction $ID_B$ 152B, and a blockchain transaction $ID_N$ 152N. These transactions contain respective eAsset-IDs 154A-154N and encrypted payloads 156A-156N. In particular, a first blockchain transaction associated with the blockchain transaction IDA 152A contains an eAsset-IDA 154A and an encrypted $payload_A$ 156A; a second blockchain transaction associated with the blockchain transaction $ID_B$ 152B contains an eAsset-$ID_B$ 154B and an encrypted $payload_B$ 156B; and a third blockchain transaction associated with the blockchain transaction $ID_N$ 152N contains an eAsset-$ID_N$ 154N and an encrypted $payload_N$ 156N. Although these blockchain transactions are illustrated as part of the collective blockchain transaction pools 150/150', it should be understood that this is merely for ease of illustration and the blockchain transactions may be stored in either the public blockchain transaction pool 150 or the private blockchain transaction pool 150' prior to being written to either the public blockchain 127 or the private blockchain 127'.

Each blockchain transaction is verified by the device gateway 120A/120B and/or the party gateways 124A/124B (as the case may be) prior to being written to a public block 158 or a private block 158' within the public or private blockchain 127/127', respectively. In order to enter the blockchain transaction pool 150/150', all blockchain transactions are processed through a digital currency verification, relying on currency amount, spent, unspent, input and output currency transactions associated therewith. This verification optionally may also include syntactic verification, transaction history, transaction size, currency range, timestamp, nonstandard syntactic patterns, referenced outputs in the public blockchain transaction pool 150 or the private blockchain transaction pool 150', and/or referenced outputs in either the public blockchain 127 or the private blockchain 127'. This should not limit or restrict additional verification processes, procedures, and/or methods. As such, this example should not be construed as being limiting in any way. After a blockchain transaction has entered the blockchain transaction pool 130, the blockchain transaction can be broadcast and becomes available to all participating device gateways 120A/120B and party gateways 124A/124B operating within the DGZ 128.

Figure 2:
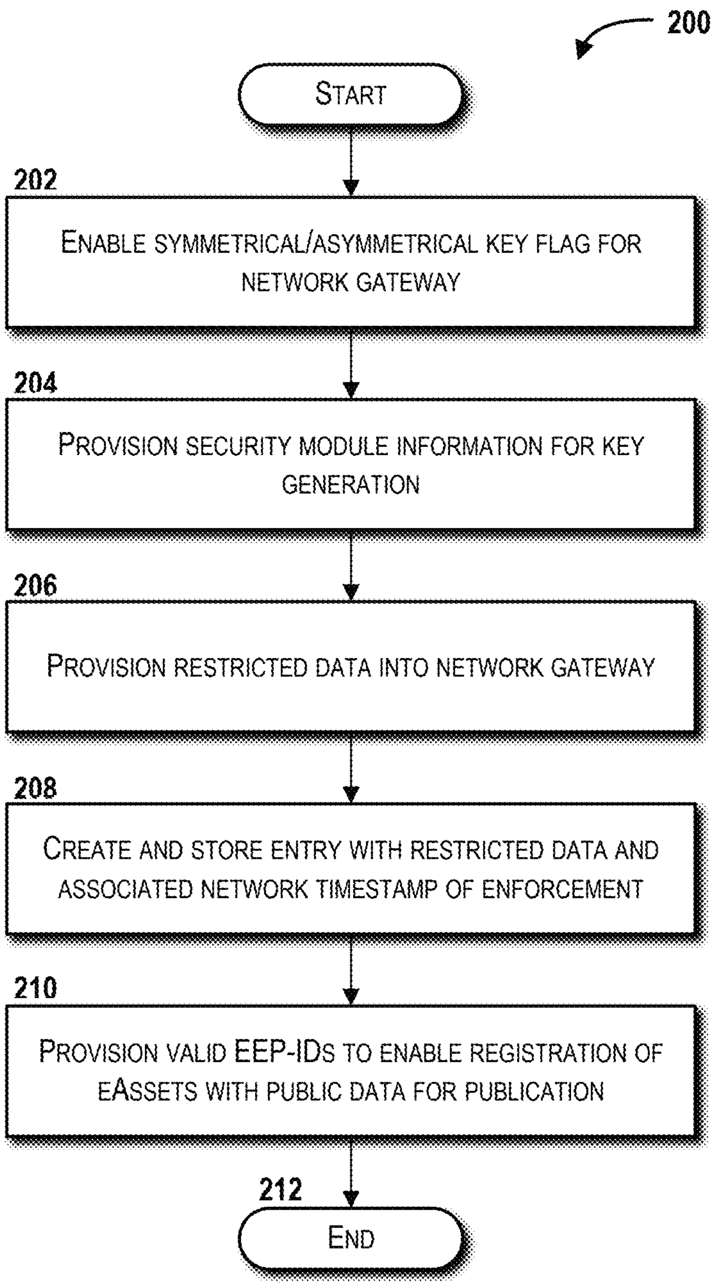
FIG. 2 is a flow diagram illustrating aspects of a method for initial provisioning of a federation platform with symmetrical and asymmetrical key support for restricted data for a particular service within a particular data governance zone ("DGZ"), according to an illustrative embodiment.

Turning now to FIG. 2, a method 200 for initial provisioning of a federation platform with symmetrical and asymmetrical key support for restricted data for a particular service within a particular DGZ 128 will be described, according to an illustrative embodiment. The method 200 is described below under the assumption that no devices or assets exist within the particular DGZ 128 for the particular service. The federation platform in the method 200 is the network gateway 116.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device to perform one or more operations, and/or causing the processor to direct other components of the computing system or device to perform one or more of the operations.

For purposes of illustrating and describing the concepts of the present disclosure, operations of the methods disclosed herein are described as being performed by the data source device 102, the network gateway 116 (home or visited), the device gateway 120 (home or visited), the $party_1$ gateway 124A (home or visited), and/or the party gateway 124N (home or visited). It should be understood that additional and/or alternative devices, servers, computers, and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the network gateway 116 is enabled for symmetrical/asymmetrical key support for restricted data for a particular service within a particular DGZ 128. In some embodiments, the network gateway 116 can include a flag or other mechanism by which features can be enabled/disabled, such as a feature for symmetrical/asymmetrical key support.

These features can be enabled and disabled manually by a federation platform administrator.

From operation 202, the method 200 proceeds to operation 204. At operation 204, the network gateway 116 is provisioned with security module information to identify the security module 140 to be used to generate cryptographic keys, such as the encryption keys 134. As noted above, the security module 140 can be external to the network gateway 116, and can be provided as a remote service. In these embodiments, the security module information can instruct the network gateway 116 how to access the security module 140, including network address, authentication information, and the like.

From operation 204, the method 200 proceeds to operation 206. At operation 206, the network gateway 116 is provisioned with restricted data. From operation 206, the method 200 proceeds to operation 208. At operation 208, the network gateway 116 creates and stores one or more entries with the restricted data and an associated network timestamp of enforcement. An entry here refers to "restricted data parameters," such as, for example, GPS or other location information, or health data. Creating these entries provides the federation platform the ability to approve or reject requests to register public data from the enterprise edge platforms. For example, if an enterprise wanted to register GPS as public data, the request would come to the federation platform, and would be rejected if an entry for GPS existed. Upon rejection, the encryption keys 134 for the particular IoT device(s) or enterprise edge platform would not be provided, and the enterprise edge platform would not be able to publish that device's IoT data into the public transaction pool 150 of the public blockchain 127. A network timestamp may be particularly useful in this example because location data may be unrestricted at one time and restricted at a different time, such as, for example, if legislation was passed in a particular DGZ's jurisdiction. At that point it would be important to note which blockchain transactions are impacted by the regulations, and also at what time that data became restricted. Since blockchain transactions all have timestamps, the blockchain transactions that are impacted by the new regulations can be identified.

From operation 208, the method 200 proceeds to operation 210. At operation 210, the network gateway 116 is provisioned with one or more valid EEP-IDs (e.g., ID for a device gateway 120 instance and/or a third party gateway 124 instance) to enable registration of eAssets with public data for publication.

From operation 210, the method 200 proceeds to operation 212. The method 200 can end at operation 212.

Figure 3:
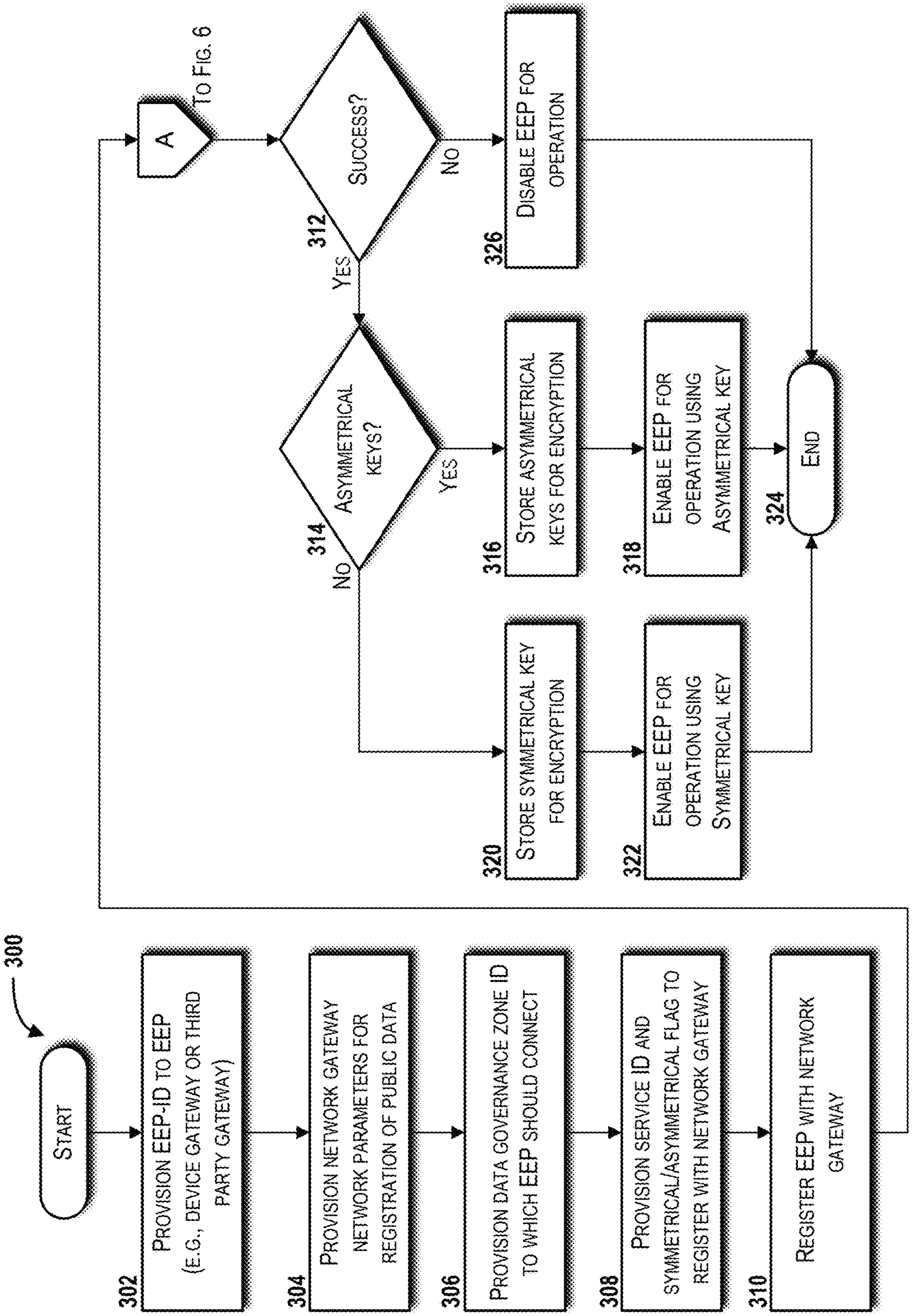
FIG. 3 is a flow diagram illustrating aspects of a method for provisioning a new enterprise edge platform with restricted data with symmetrical and asymmetrical encryption keys, according to an illustrative embodiment.

Turning now to FIG. 3, a method 300 for provisioning a new EEP with restricted data with symmetrical and asymmetrical encryption keys 134 will be described, according to an illustrative embodiment. In the method 300, the EEP is described as the device gateway 120, although other EEPs such as the third party gateways 124 can perform the same operations.

The method 300 begins and proceeds to operation 302. At operation 302, the device gateway 120 is provisioned with a valid EEP-ID to be used by the device gateway 120 to uniquely identify itself to the network gateway 116. From operation 302, the method 300 proceeds to operation 304. At operation 304, the device gateway 120 is provisioned with network parameters of the network gateway 116. The device gateway 120 can use the network parameters to communicate with the network gateway 116 for the registration of public data. From operation 304, the method 300 proceeds to operation 306. At operation 306, the device gateway 120 is provisioned with a DGZ ID for the DGZ 128 to which the device gateway 120 should connect.

From operation 306, the method 300 proceeds to operation 308. At operation 308, the device gateway 120 is provisioned with a service ID for a particular service to be supported by the device gateway 120. The device gateway 120 is also provisioned with a symmetrical/asymmetrical flag to be used by the device gateway 120 to register with the network gateway 116 for symmetrical or asymmetrical cryptography. From operation 308, the method 300 proceeds to operation 310. At operation 310, the device gateway 120 utilizes the information provisioned in operations 302-308 to generate and send a registration request to the network gateway 116.

From operation 310, the method 300 proceeds to FIG. 6 (described herein below), and in particular, operation 602 of a method 600. The method 600 proceeds as described below. The method 600 can be performed by the network gateway 116. The method 600 can return to the method 300 a successful result (symmetrical key), a failed result, or a private key (asymmetrical key). The method 300 then proceeds to operation 312. At operation 312, the device gateway 120 determines whether the result of the method 600 was successful. If so, the method 300 proceeds to operation 314. At operation 314, the device gateway 120 determines if asymmetrical keys are available based upon the results of the method 600. That is, the method 600 returned the private key (asymmetrical key) at operation 610. If asymmetrical keys are available, the method 300 proceeds to operation 316. At operation 316, the device gateway 120 stores the asymmetrical key for encryption. From operation 316, the method 300 proceeds to operation 318. At operation 318, the device gateway 120 is enabled for operation using the asymmetrical key. Returning to operation 314, if no asymmetrical keys are available, the method 300 proceeds to operation 320. At operation 320, the device gateway 120 stores the symmetrical key for encryption. From operation 320, the method 300 proceeds to operation 322. At operation 322, the device gateway 120 is enabled for operation using the symmetrical key. From operation 318 or operation 322, the method 300 proceeds to operation 324. At operation 324, the method 300 can end.

Returning to operation 312, if the results of the method 600 was unsuccessful, the method 300 proceeds to operation 326. At operation 326, the device gateway 120 is disabled for operation. From operation 326, the method 300 proceeds to operation 324. At operation 324, the method 300 can end.

Figure 4:
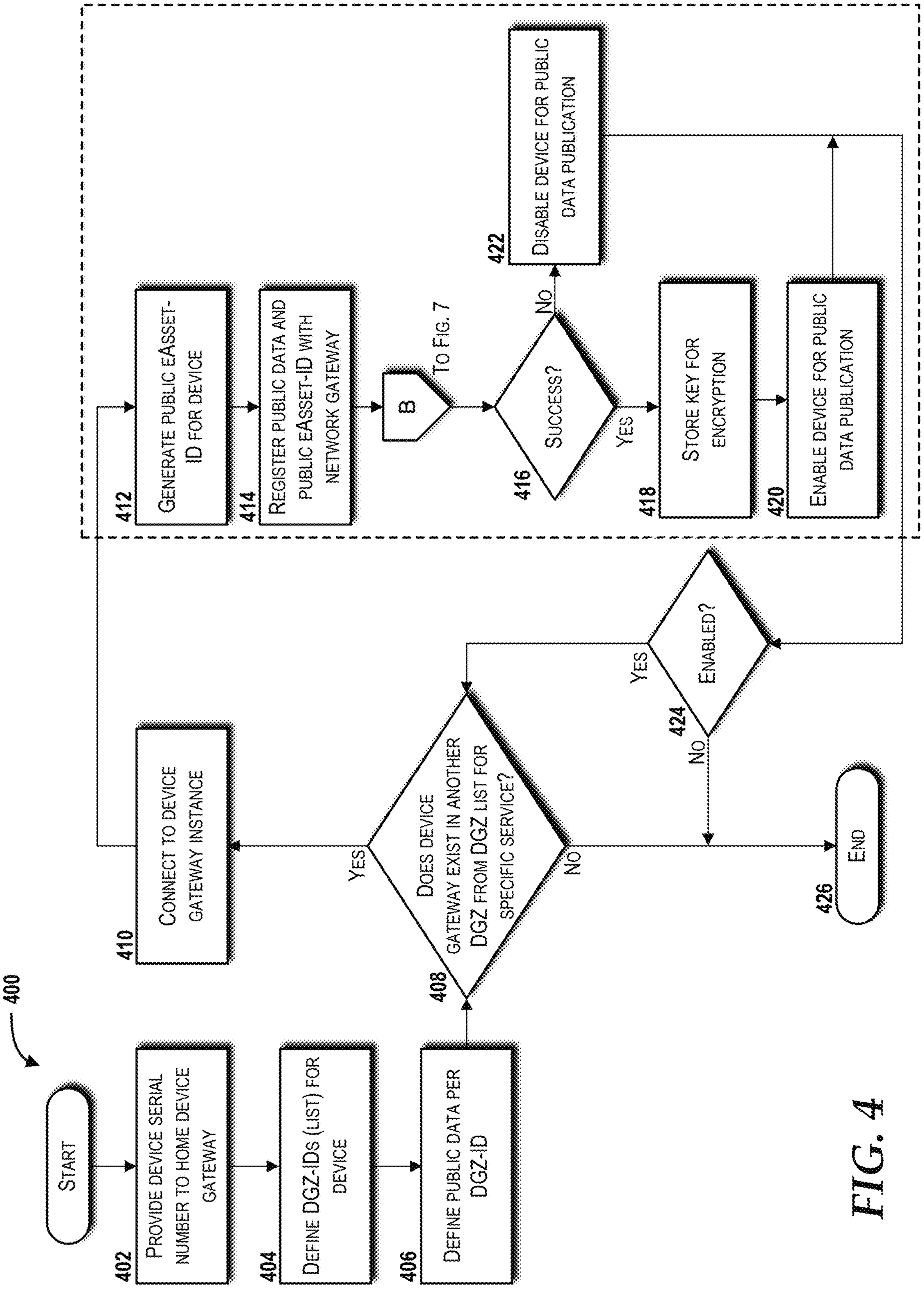
FIG. 4 is a flow diagram illustrating aspects of a method for network provisioning the enablement of publication of public data of a new device with keys for operation, according to an illustrative embodiment.

Turning now to FIG. 4, a method 400 for network provisioning the enablement of publication of public data of a new device with keys for operation will be described, according to an illustrative embodiment. The method 400 begins and proceeds to operation 402. At operation 402, the device gateway 120 provides a device serial number associated with the new device (e.g., the device 102) to the home device gateway 120A (i.e., the device gateway 120 operating in the home DGZ 128A of the device 102). From operation 402, the method 400 proceeds to operation 404. At operation 404, the device gateway 120 defines a list of DGZ-IDs of the DGZs 128 that the device 102 is allowed to operate within. From operation 404, the method 400 proceeds to operation 406. At operation 406, the device gateway 120 defines what data is to be considered public for each DGZ 128 identified in the list of DGZ-IDs.

From operation 406, the method 400 proceeds to operation 408. At operation 408, the device gateway 116 determines if an instance of the device gateway 120 exists in another DGZ 128 (e.g., the visited DGZ 128B) from the DGZ list for the specific service. If so, the method 400 proceeds to operation 410. At operation 410, the network gateway 116 connects to the device gateway 120 operating in the other DGZ 128 (e.g., an instance of the visited device gateway 120B).

From operation 410, the method 400 proceeds to operation 412. At operation 412, the device gateway 120 generates an eAsset-ID 154 (shown in FIG. 1E) for the device 102. The eAsset-ID 154, in this example, is a public eAsset-ID that is particular to the device 102. From operation 412, the method 400 proceeds to operation 414. At operation 414, the device gateway 120 registers public data and the device public eAsset-ID 1014 with the network gateway 116.

From operation 414, the method 400 proceeds to FIG. 7 (described herein below), and in particular, operation 702 of a method 700. The method 700 proceeds as described below. The method 700 can be performed by the network gateway 116. The method 700 can return to the method 400 a successful result or a failed result. A successful result can be the return of a symmetrical key or an asymmetrical key. The method 400 then proceeds to operation 416.

At operation 416, the device gateway 120 determines whether the result of the method 700 was successful. If so, the method 400 proceeds to operation 418. At operation 418, the device gateway 120 stores the encryption key(s) (symmetrical or asymmetrical) received from the network gateway 116 as a result of the method 700. From operation 418, the method 400 proceeds to operation 420. At operation 420, the device gateway 120 can enable the device 102 for public data publication. Returning to operation 416, if the result of the method 700 was unsuccessful, the method 400 proceeds to operation 422. At operation 422, the device gateway 120 can disable the device 102 for public data publication.

From operation 420 or operation 422, the method 400 proceeds to operation 424. At operation 424, the network gateway 116 determines if the device 102 is enabled for public data publication. If so, the method 400 returns to operation 408, and the method 400 proceeds as described above for the next device gateway 120 that exists in another DGZ 128 in the DGZ list. If, however, the network gateway 116 determines that the device 102 is disabled for public data publication, the method 400 proceeds to operation 426. The method 400 can end at operation 426.

Figure 5:
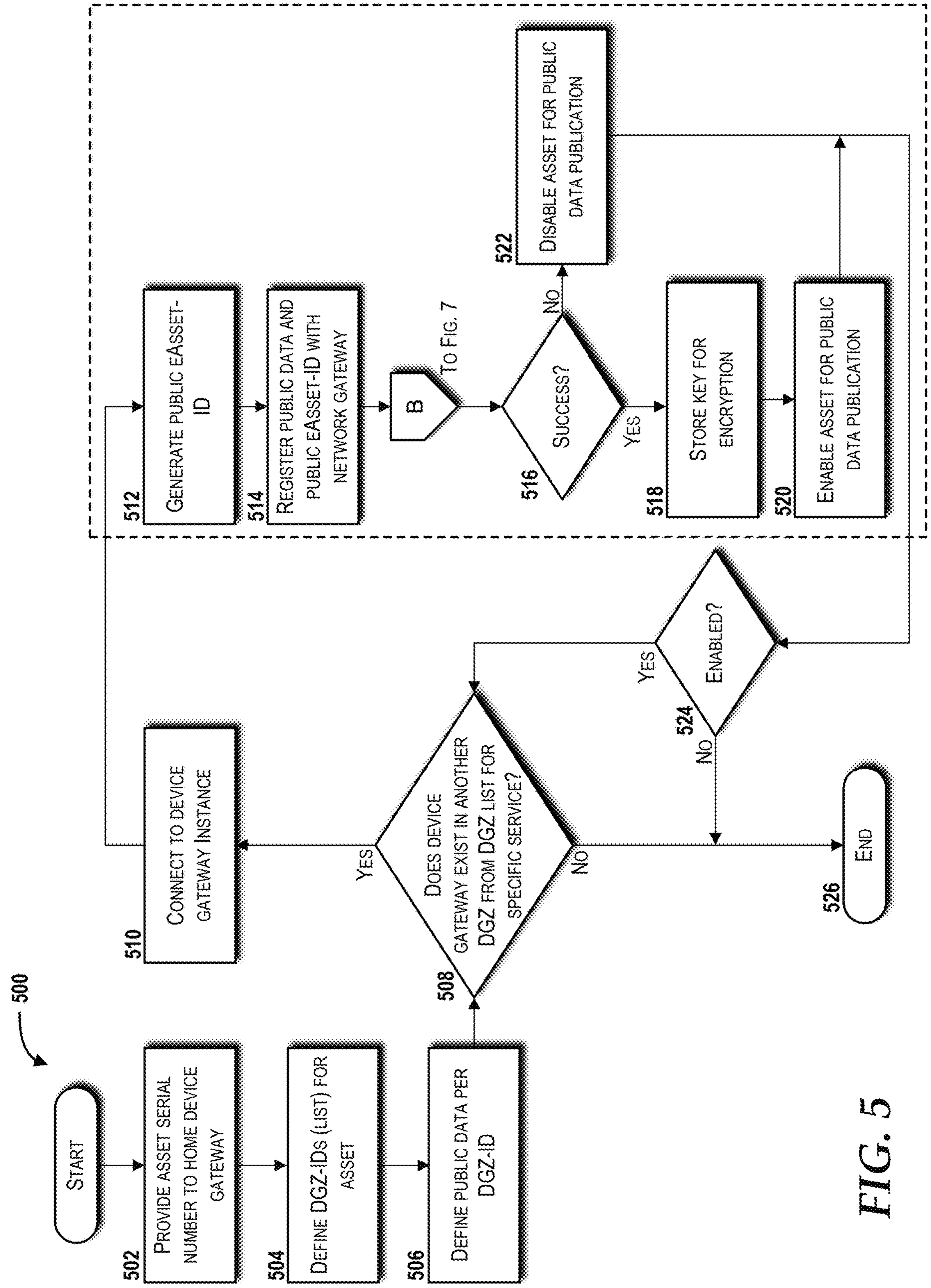
FIG. 5 is a flow diagram illustrating aspects of a method for network provisioning the enablement of publication of public data of a new asset with keys for operation will be described, according to an illustrative embodiment.

Turning now to FIG. 5, a method 500 for network provisioning the enablement of publication of public data of a new asset with keys for operation will be described, according to an illustrative embodiment. The method 500 begins and proceeds to operation 502. At operation 502, the device gateway 120 provides an asset serial number associated with the new asset (e.g., the asset 1502 best shown in FIG. 15) to the home device gateway 120A (i.e., the device gateway 120 operating in the home DGZ 128A of the asset 1502). From operation 502, the method 500 proceeds to operation 504. At operation 504, the device gateway 120 defines a list of DGZ-IDs of the DGZs 128 that the asset 1502 is allowed to operate within. From operation 504, the method 500 proceeds to operation 506. At operation 506, the device gateway 120 defines what data is to be considered public for each DGZ 128 identified in the list of DGZ-IDs.

From operation 506, the method 500 proceeds to operation 508. At operation 508, the device gateway 120 determines if an instance of the device gateway 120 exists in another DGZ 128 (e.g., the visited DGZ 128B) from the DGZ list for the specific service. If so, the method 500 proceeds to operation 510. At operation 510, the device gateway 120 connects to the device gateway 120 operating in the other DGZ 128 (e.g., an instance of the visited device gateway 120B).

From operation 510, the method 500 proceeds to operation 512. At operation 512, the device gateway 120 generates an eAsset-ID 154 (shown in FIG. 1E) for the asset 1502. The eAsset-ID 154, in this example, is a public eAsset-ID that is particular to the asset 1502. This type of eAsset-ID 154 is also referred to herein as an asset public eAsset-ID. From operation 512, the method 500 proceeds to operation 514. At operation 514, the device gateway 120 registers public data and the asset public eAsset-ID with the network gateway 116.

From operation 514, the method 500 proceeds to FIG. 7 (described herein below), and in particular, operation 702 of a method 700. The method 700 proceeds as described below. The method 700 can be performed by the network gateway 116. The method 700 can return to the method 500 a successful result or a failed result. A successful result can be the return of a symmetrical key or an asymmetrical key. The method 500 then proceeds to operation 516.

At operation 516, the device gateway 120 determines whether the result of the method 700 was successful. If so, the method 500 proceeds to operation 518. At operation 518, the device gateway 120 stores the encryption key(s) (symmetrical or asymmetrical) received from the network gateway 116 as a result of the method 700. From operation 518, the method 500 proceeds to operation 520. At operation 520, the device gateway 120 can enable the asset 1502 for public data publication. Returning to operation 516, if the result of the method 700 was unsuccessful, the method 500 proceeds to operation 522. At operation 522, the device gateway 120 can disable the asset 1502 for public data publication.

From operation 520 or operation 522, the method 500 proceeds to operation 524. At operation 524, the network gateway 116 determines if the asset 1502 is enabled for public data publication. If so, the method 500 returns to operation 508, and the method 500 proceeds as described above for the next device gateway 120 that exists in another DGZ 128 in the DGZ list. If, however, the network gateway 116 determines that the asset 1502 is disabled for public data publication, the method 500 proceeds to operation 526. The method 500 can end at operation 526.

Figure 6:
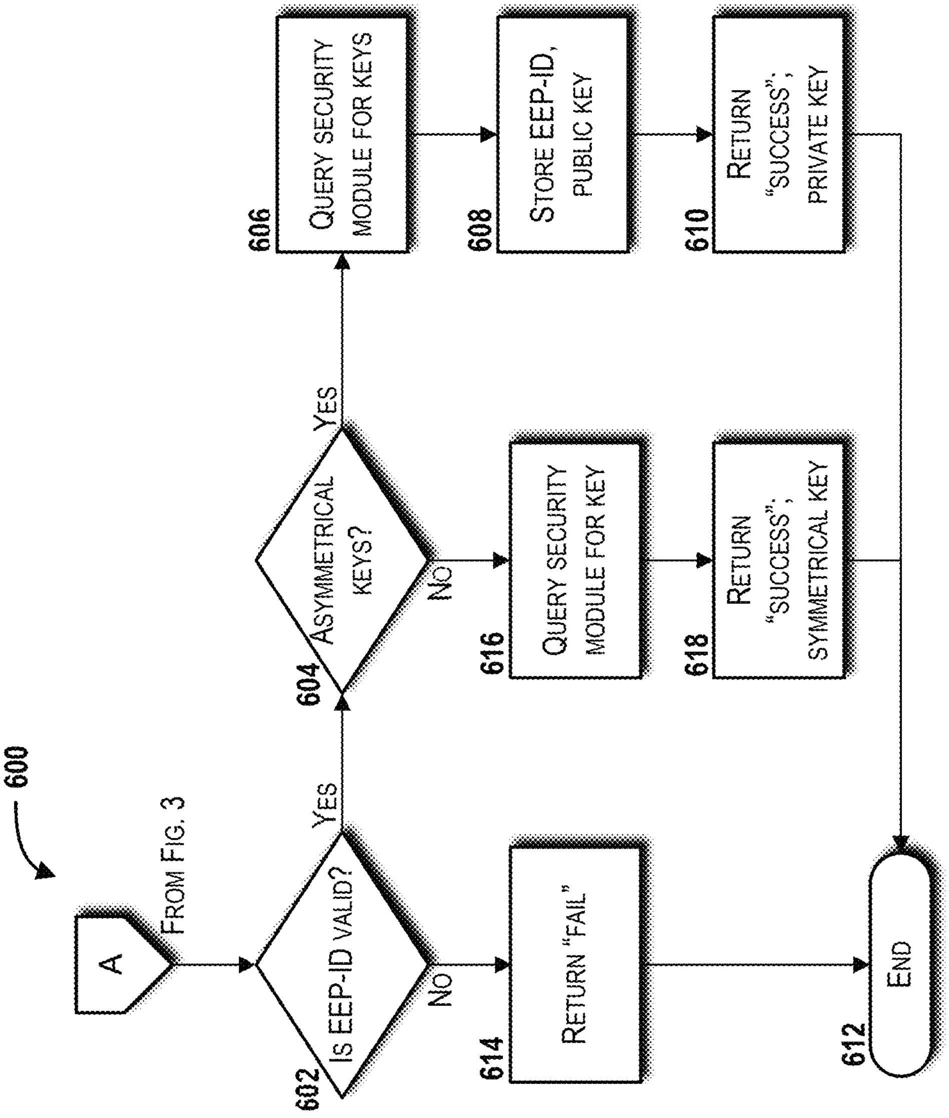
FIG. 6 is a flow diagram illustrating aspects of a method for registering a new enterprise edge platform and for generating keys for the new enterprise edge platform, according to an illustrative embodiment.

Turning now to FIG. 6, a method 600 for registering a new EEP and for generating encryption keys for a new EEP will be described, according to an illustrative embodiment. In the method 600, the EEP is described as the device gateway 120, although other EEPs such as the third party gateways 124 can be registered by the network gateway 116 in accordance with the operations of the method 600.

The method 600 proceeds in response to operation 310 of the method 300 described above with reference to FIG. 3. Moreover, output of the method 600 is fed back into the method 300 at operation 312. The method 600 begins and proceeds to operation 602. At operation 602, the network gateway 116 determines if the EEP-ID provided by the device gateway 120 is valid. If so, the method 600 proceeds to operation 604.

At operation 604, the network gateway 116 determines if an asymmetrical key flag was included in the registration request received from the device gateway 120. If asymmetrical keys are available, the method 600 proceeds to operation 606. At operation 606, the network gateway 116 queries the security module 140 for asymmetrical keys. The security module 140 responds with the asymmetrical keys, including a public key and a private key. From operation 606, the method 600 proceeds to operation 608. At operation 608, the network gateway 116 stores the EEP-ID in association with the public key. From operation 608, the method 600 proceeds to operation 610. At operation 610, the network gateway 116 returns the private key to the device gateway 120 (see operation 312 of the method 300). From operation 610, the method 600 proceeds to operation 612. The method 600 can end at operation 612.

Returning to operation 602, if the network gateway 116 determines that the EEP-ID is invalid, the method 600 proceeds to operation 614. At operation 614, the method 600 fails and proceeds to operation 612. The method 600 can end at operation 612.

Returning to operation 604, if the network gateway 116 determines that the asymmetrical key flag was not included in the registration request received from the device gateway 120, the method 600 proceeds to operation 616. At operation 616, the network gateway 116 queries the security module for a symmetrical key. From operation 616, the method 600 proceeds 618. At operation 618, the network gateway 116 can return a successful result to indicate that the device gateway 120 is enabled for operation using its symmetrical key. From operation 618, the method 600 proceeds to operation 612. The method can end at operation 612.

Figure 7:
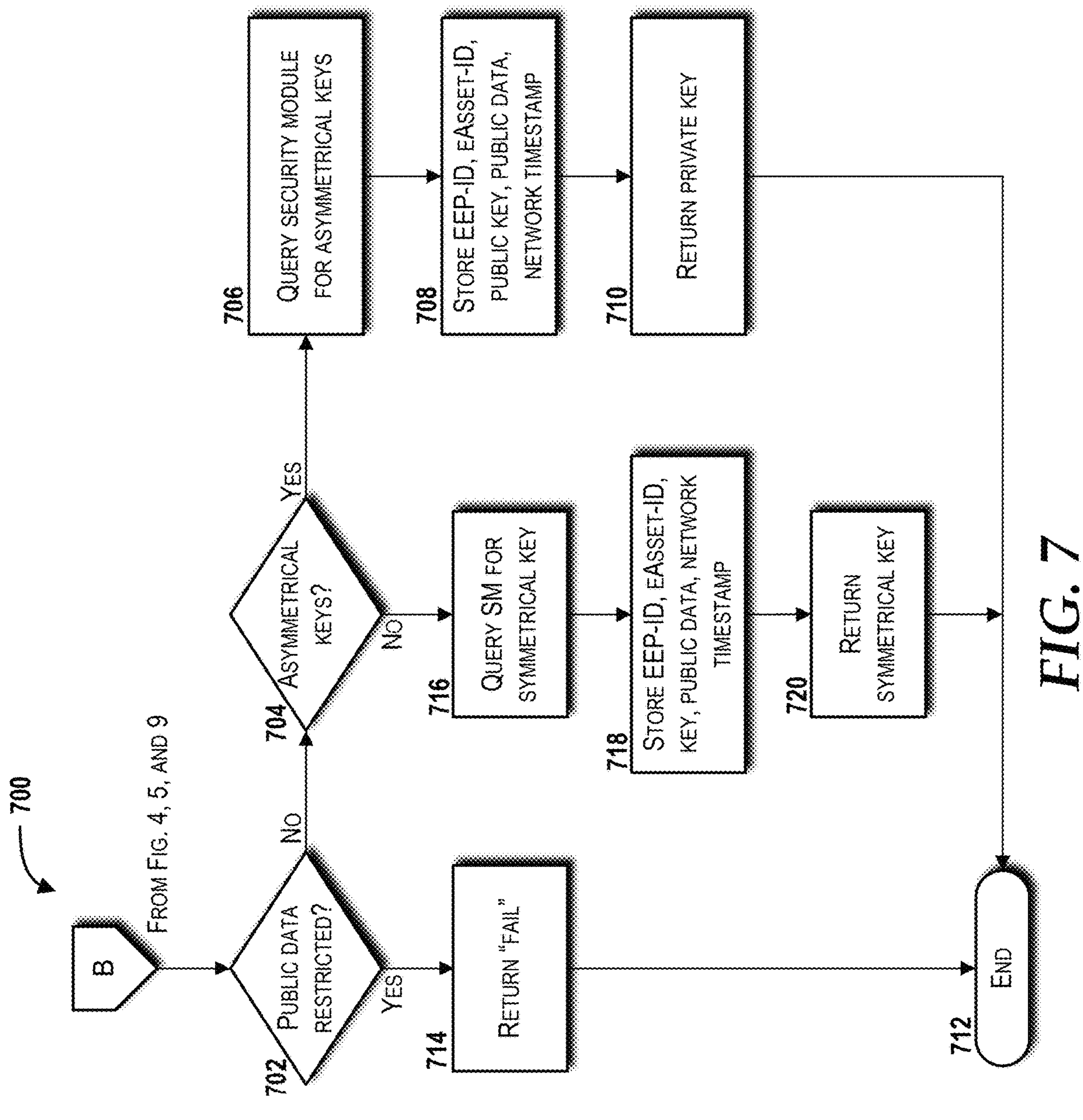
FIG. 7 is a flow diagram illustrating aspects of a method for registering a new eAsset-ID and for generating keys for the new eAsset-ID, according to an illustrative embodiment.

Turning now to FIG. 7 a method 700 for registering a new eAsset-ID 156 and for generating keys for the new eAsset-ID 156 will be described, according to an illustrative embodiment. The method 700 proceeds in response to operation 414 of the method 400 described above with reference to FIG. 4. Moreover, output of the method 700 is fed back into the method 400 at operation 416. Similarly, the method 700 proceeds in response to operation 514 of the method 500 described above with reference to FIG. 5. Moreover, output of the method 700 is fed back into the method 500 at operation 516. A method 900 described below with reference to FIG. 9 also utilizes the method 700. In particular, operation 904 of the method 900 proceeds to the method 700, the output of which is fed into operation 906.

The method 700 begins and proceeds to operation 702. At operation 702, the network gateway 116 receives a registration request and determines if registration request contains restricted data parameters. The network gateway 116 can determine if the registration request contains restricted data based upon the entry (ies) created at operation 208 of the method 200 described above. If the public data does not contain restricted data, the method 700 proceeds to operation 704. At operation 704, the network gateway 116 determines if asymmetrical keys (public/private key pair) are available for the device gateway 120. In other words, whether the device gateway 120 includes the asymmetrical flag provisioned at operation 308 of the method 300 described above. If asymmetrical keys are available, the method 700 proceeds to operation 706. At operation 706, the network gateway 116 queries the security module 140 for the asymmetrical keys. The security module 140 returns the asymmetrical keys, including a private key and a public key.

From operation 706, the method 700 proceeds to operation 708. At operation 708, the network gateway 116 stores the EEP-ID, the eAsset-ID 154 (e.g., the device public eAsset-ID 1014), the public data, a network timestamp, and the public key. From operation 708, the method 700 proceeds to operation 710. At operation 710, the network gateway 116 returns the private key to the device gateway 120 (see operation 416 of the method 400; operation 516 of the method 500; and operation 906 of the method 900). From operation 710, the method 700 proceeds to operation 712. The method 700 can end at operation 712.

Returning to operation 702, if the network gateway 116 instead determines that the public data does contain restricted data, the method 700 proceeds to operation 714. At operation 714, the method 700 fails and proceeds to operation 712. The method 700 can end at operation 712.

Returning to operation 704, if the network gateway 116 instead determines that asymmetrical keys are not available for the device gateway 120, the method 700 proceeds to operation 716. At operation 716, the network gateway 116 can query the security module 140 for a symmetrical key. From operation 716, the method 700 proceeds to operation 718. At operation 718, the network gateway 116 stores the EEP-ID, the eAsset-ID 154 (e.g., the device public eAsset-ID 1014), the public data, a network timestamp, and the symmetrical key. From operation 718, the method 700 proceeds to operation 720. At operation 720, the network gateway 116 returns the symmetrical key. From operation 720, the method 700 proceeds to operation 712. The method 700 can end at operation 712.

Figure 8:
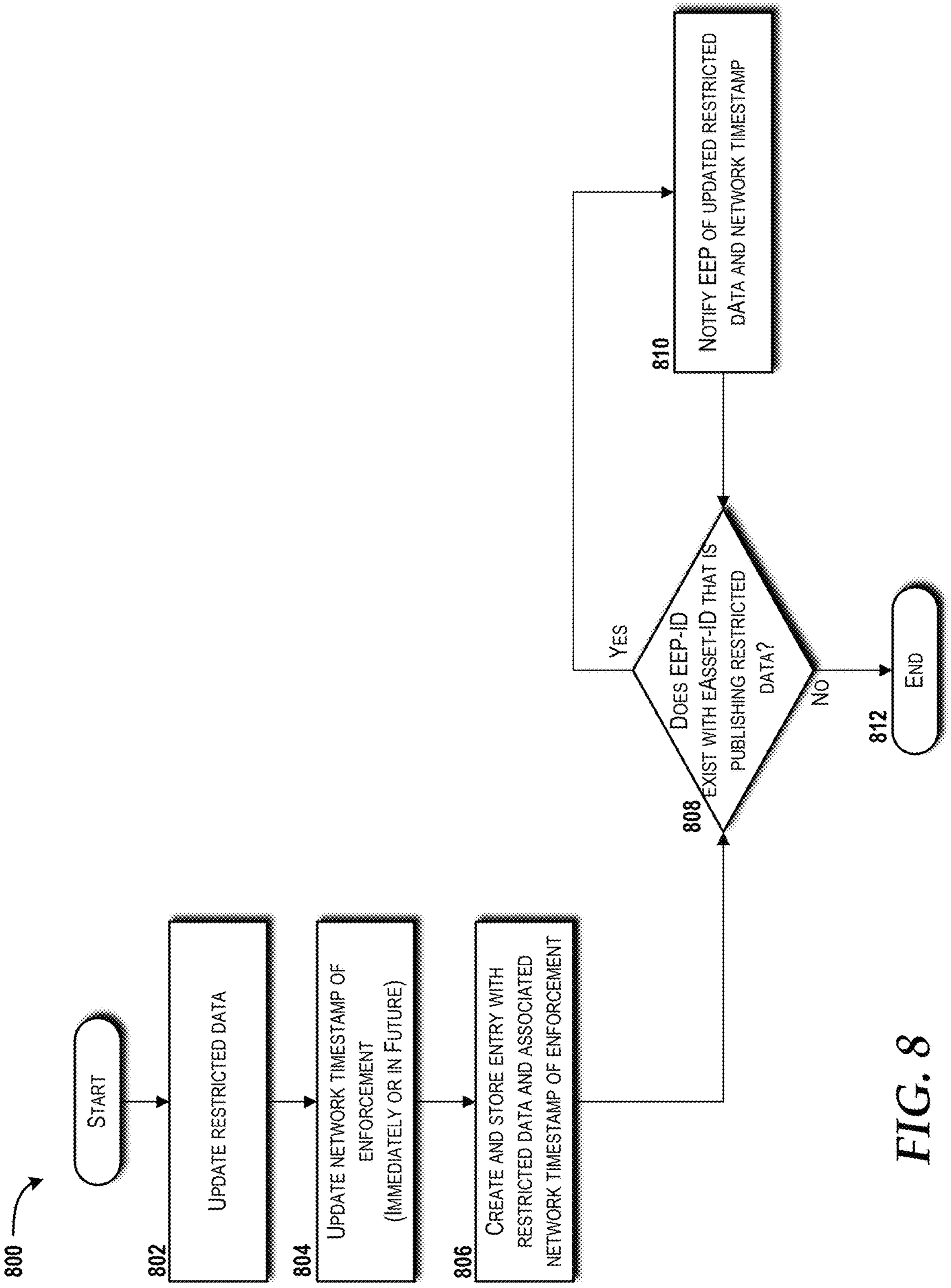
FIG. 8 is a flow diagram illustrating aspects of a method for updating restricted data in a federation platform for a particular service within a particular DGZ, according to an illustrative embodiment.

Turning now to FIG. 8, a method 800 for updating restricted data in a federation platform for a particular service within a particular DGZ 128 will be described, according to an illustrative embodiment. The method 800 is described from the perspective of the federation platform embodied as the network gateway 116.

The method 800 begins and proceeds to operation 802. At operation 802, the network gateway 116 is updated as to which public data is to be treated as restricted (i.e., the restricted data). From operation 802, the method 800 proceeds to operation 804. At operation 804, the network gateway 116 updates a network timestamp of enforcement ("network timestamp") of when the restricted data is to be enforced. The network timestamp can be a current time (e.g., for immediate enforcement) or a future time (e.g., for delayed enforcement). The network timestamp can be stored in the time validity store 138 in association with one or more of the encryption keys 134.

From operation 804, the method 800 proceeds to operation 806. At operation 806, the network gateway 116 can create and store an entry with the restricted data and the associated network timestamp in the time validity store 138. From operation 806, the method 800 proceeds to operation 808. At operation 808, the network gateway 116 determines if an EEP-ID exists of an EEP (e.g., an instance of the device gateway 120 or an instance of the third party gateway 124) with an eAsset-ID 154 associated with a device 102 or an asset 1502 that is publishing restricted data. If so, the method 800 proceeds to operation 810. At operation 810, the network gateway 116 uses the notification engine 146 to notify the EEP (e.g., an instance of the device gateway 120 or an instance of the third party gateway 124) of the updated restricted data and the updated network timestamp. From operation 810, the method 800 returns to operation 808, which repeats until no additional EEP-IDs exist with an eAsset-ID 154 associated with a device 102 or an asset 1502 that is publishing restricted data. If no additional EEP-IDs exist, the method 800 proceeds to operation 812. The method 800 can end at operation 812.

Figure 9:
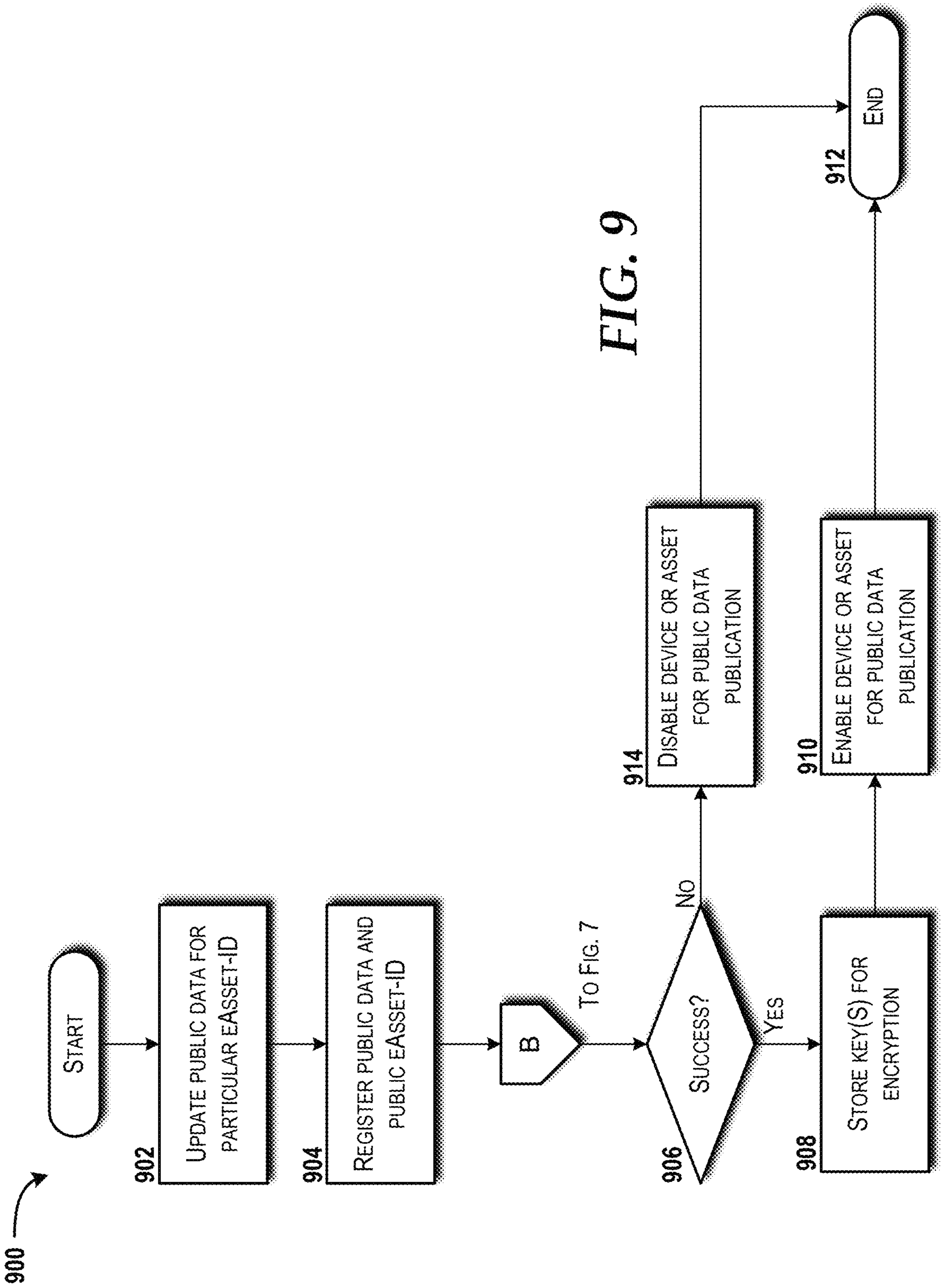
FIG. 9 is a flow diagram illustrating aspects of a method for updating restricted data in an enterprise edge platform for a particular service, according to an illustrative embodiment.

Turning now to FIG. 9, a method 900 for updating restricted data in an EEP for a particular service will be described, according to an illustrative embodiment. The method 900 is described from the perspective of the EEP embodied as the device gateway 120. The method 900 can be triggered either manually by an EEP administrator or automatically by the federation platform (e.g., the network gateway 116) using a notification.

The method 900 begins and proceeds to operation 902. At operation 902, the device gateway 120 updates the public data for a particular public eAsset-ID (e.g., the device public eAsset-ID 1014 or the asset public eAsset-ID as the case may be). From operation 902, the method 900 proceeds to operation 904. At operation 904, the device gateway 120 registers the updated public data and the public eAsset-ID with the network gateway 116. From operation 904, the method 900 proceeds to the method 700 described above with reference FIG. 7, and in particular, to operation 700 of the method 700. The method 700 proceeds as described above.

The result of the method 700 is fed back to the method 900 at operation 906. At operation 906, the device gateway 120 determines if the result of the method 700 was successful. If so, the method 900 proceeds to operation 908. At operation 908, the device gateway 120 stores the key(s) (symmetrical or asymmetrical) for encryption.

From operation 908, the method 900 proceeds to operation 910. At operation 910, the device gateway 120 enables the device 102 (or asset 1502) for public data publication. From operation 910, the method 900 proceeds to operation 912. The method 900 can end at operation 912. Returning to operation 906, if the device gateway 120 instead determines that the results of the method 700 was unsuccessful, the method 900 proceeds to operation 914. At operation 914, the device gateway 120 disables the device 102 (or asset 1502) for public data publication. From operation 914, the method 900 proceeds to operation 912. The method 900 can end at operation 912.

Turning now to FIG. 10A, a block diagram illustrating aspects of a device-only blockchain transaction payload 1000 will be described, according to an illustrative embodiment. The device-only blockchain transaction payload 1000 is the payload of IoT transactions that originate from the data source device 102 and terminate at the enterprise edge gateways, such as a device gateway 120 or a third party gateway 124, wherein the data source device 102 is a device-only (i.e., no asset accompanies the device). The device-only blockchain transaction payload 1000 includes public and private versions, including a public device-only blockchain transaction payload 1000A and a private device-only blockchain transaction payload 1000B.

The public device-only blockchain transaction payload 1000A can include one or more public message fields 1004, a message type 1006, and a device ruleset 1008. The public message fields 1004 can include public data contained in an IoT message such as the data message 104 (best shown in FIG. 1). The message type 1006 can include meta-data to indicate the type of IoT message (e.g., sensor-data, alarm, etc.). The device ruleset 1008 can include one or more rules established for the device 102.

The private device-only blockchain transaction payload 1000B can include a public blockchain transaction ID 1010, all message fields 1012, and the message type 1006. The all message fields 1012 field can include the public message fields 1004 and any private message fields (not shown separately). The private message fields can include private data contained in a data message such as the data message 104 (best shown in FIG. 1A). The message type 1006 can include meta-data to indicate the type of IoT message (e.g., sensor-data, alarm, etc.).

Turning now to FIG. 10B, a block diagram illustrating aspects of a device+asset blockchain transaction payload 1002 will be described, according to an illustrative embodiment. The device+asset blockchain transaction payload 1002 is the payload of IoT transactions that originate from the data source device 102 and terminate at the enterprise edge gateways, such as a device gateway 120 or a third party gateway 124, wherein the data source device 102 is a combination device+asset 1500 (best shown in FIG. 15). The device+asset blockchain transaction payload 1002 includes public and private versions, including a public device+asset blockchain transaction payload 1002A and a private device+asset blockchain transaction payload 1000B.

The public device+asset blockchain transaction payload 1002A can include one or more public message fields 1004, the message type 1006, the device public eAsset-ID 1014, and an asset ruleset 1016. The public message fields 1004 can include public data contained in a data message such as the data message 104 (best shown in FIG. 1A). The message type 1006 can include meta-data to indicate the type of IoT message (e.g., sensor-data, alarm, etc.). The device public eAsset-ID 1014 can uniquely identify the device 102 for use in transactions on the public blockchain 127. The asset ruleset 1016 can include one or more rules established for the asset 1502.

The private device+asset blockchain transaction payload 1002B can include the public blockchain transaction ID 1010, the all message fields 1012, a device private eAsset-ID 1018, and the message type 1006. The all message fields 1012 field can include the public message fields 1004 and any private message fields (not shown separately). The private message fields can include private data contained in a data message such as the data message 104 (best shown in FIG. 1). The device private eAsset-ID 1018 can uniquely identify the device 102 for use in transactions on the private blockchain 127'. The message type 1006 can include meta-data to indicate the type of IoT message (e.g., sensor-data, alarm, etc.).

The terms "public blockchain transaction payload" and "private blockchain transaction payload" are used herein to refer to blockchain transaction payloads on the public blockchain 127 and the private blockchain 127', respectively. Moreover, these terms may refer to a device-only, a device+asset, or both, unless otherwise specified.

Figure 11:
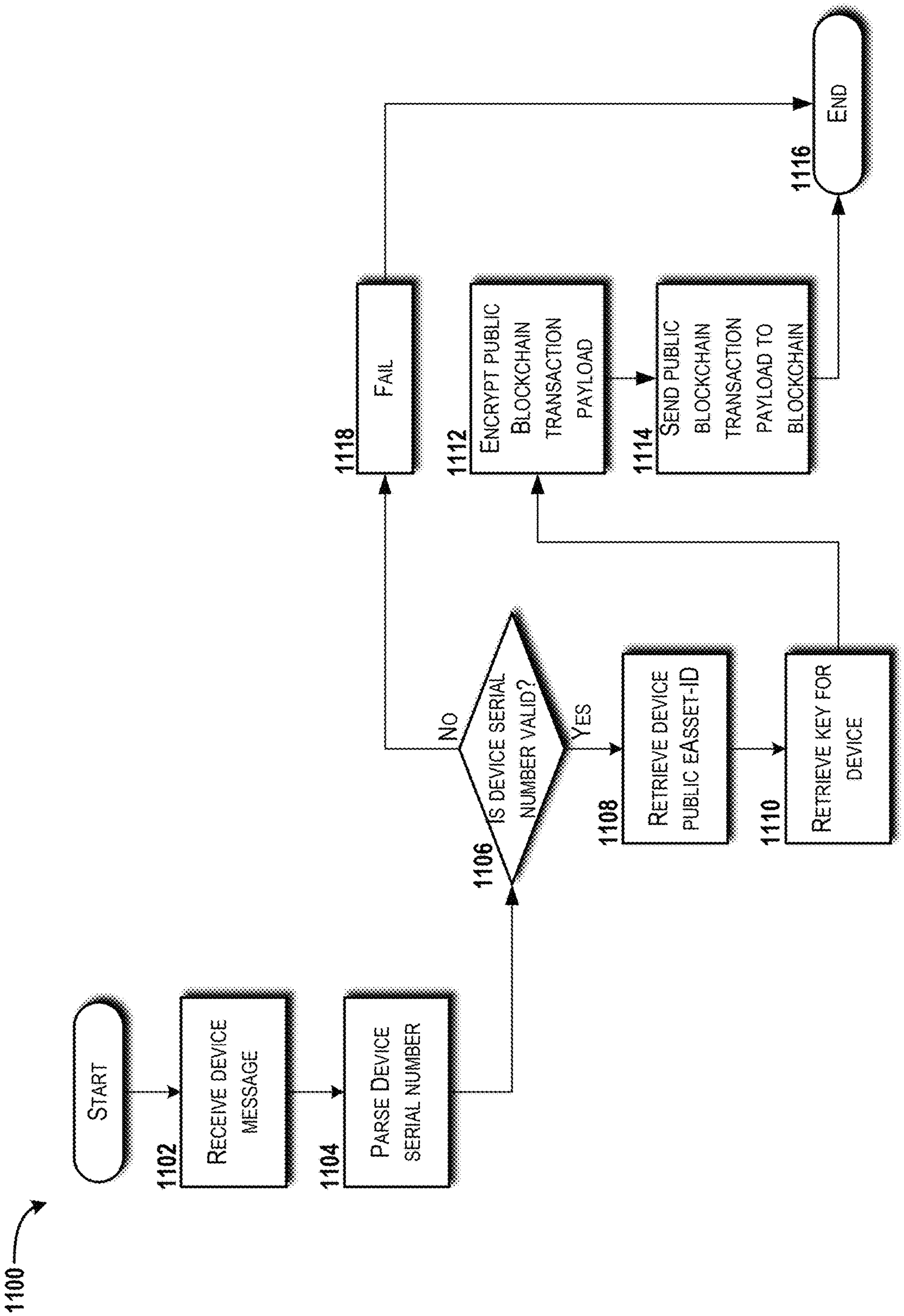
FIG. 11 is a flow diagram illustrating aspects of a method for encrypting public device data and publishing to a public blockchain, according to an illustrative embodiment.

Turning now to FIG. 11, a method 1100 for encrypting public device data and publishing to the public transaction pool 150 of the public blockchain 127 will be described, according to an illustrative embodiment. The method 1100 begins and proceeds to operation 1102. At operation 1102, the device gateway 120 receives a message, such as the data message 104 (best shown in FIG. 1A). From operation 1102, the method 1100 proceeds to operation 1104. At operation 1104, the device gateway 120 parses the device serial number from the data message 104 to identify the device 102 that sent the data message 104.

From operation 1104, the method 1100 proceeds to operation 1106. At operation 1106, the device gateway 120 determines if the device serial number is valid. If so, the method 1100 proceeds to operation 1108. At operation 1108, the device gateway 120 retrieves the device public eAsset-ID 1014.

From operation 1108, the method 1100 proceeds to operation 1110. At operation 1110, the device gateway 120 retrieves the encryption key for the device 102. From operation 1110, the method 1100 proceeds to operation 1112. At operation 1112, the device gateway 120 encrypts the public blockchain transaction payload using the encryption key retrieved at operation 1110. From operation 1112, the method 1100 proceeds to operation 1114. At operation 1114, the device gateway 120 sends the public blockchain transaction payload to the public transaction pool 150 of the public blockchain 127. From operation 1114, the method 1100 proceeds to operation 1116. The method 1100 can end at operation 1116.

Returning to operation 1106, if the device gateway 120 determines that the device serial number is invalid, the method 1100 proceeds to operation 1118. At operation 1118, the method 1100 fails and proceeds to operation 1116. The method 1100 can end at operation 1116.

Figure 12:
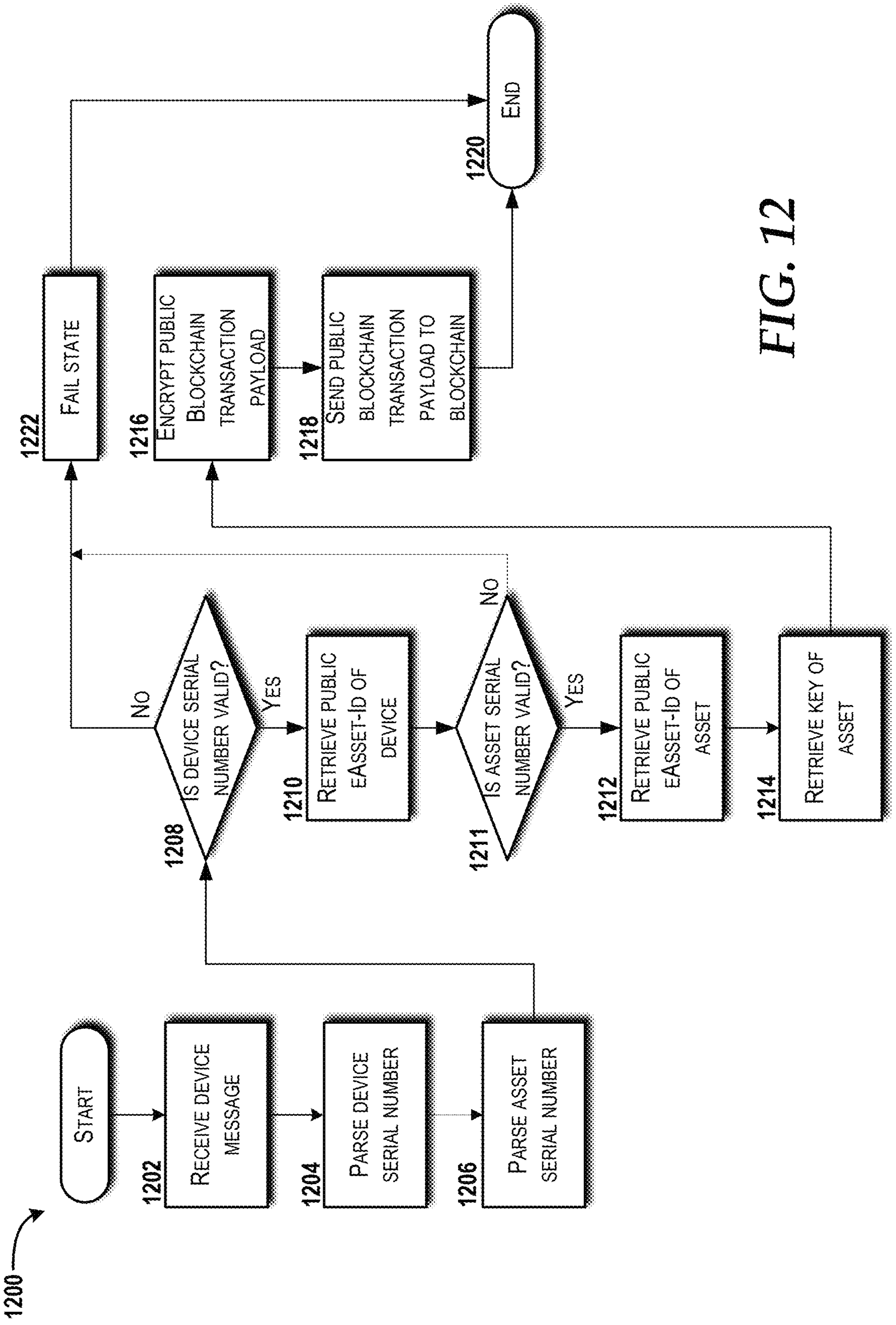
FIG. 12 is a flow diagram illustrating aspects of a method for encrypting public device+asset data and publishing to a public blockchain, according to an illustrative embodiment.

Turning now to FIG. 12, a method 1200 for encrypting public device+asset data and publishing to the public transaction pool 150 of the public blockchain 127 will be described, according to an illustrative embodiment. The method 1200 begins and proceeds to operation 1202. At operation 1202, the device gateway 120 receives a message, such as the data message 104 (best shown in FIG. 1A). From operation 1202, the method 1200 proceeds to operation 1204. At operation 1204, the device gateway 120 parses the device serial number from the data message 104 to identify the device 102 that sent the data message 104. From operation 1204, the method 1200 proceeds to operation 1206. At operation 1206, the device gateway 120 parses the asset serial number from the data message 104 to identify the asset 1502.

From operation 1206, the method 1200 proceeds to operation 1208. At operation 1208, the device gateway 120 determines if the device serial number is valid. If so, the method 1200 proceeds to operation 1210. At operation 1210, the device gateway 120 retrieves the device public eAsset-ID. From operation 1210, the method 1200 proceeds to operation 1211. At operation 1211, the device gateway 120 determines if the asset serial number is valid. If so, the method 1200 proceeds to operation 1212. At operation 1212, the device gateway 120 retrieves the asset public eAsset-ID.

From operation 1212, the method 1200 proceeds to operation 1214. At operation 1214, the device gateway 120 retrieves the encryption key for the asset 1502. From operation 1214, the method 1200 proceeds to operation 1216. At operation 1216, the device gateway 120 encrypts the public blockchain transaction payload using the encryption key retrieved at operation 1214. From operation 1216, the method 1200 proceeds to operation 1218. At operation 1218, the device gateway 120 sends the public blockchain transaction payload to the public transaction pool 150 of the public blockchain 127. From operation 1218, the method 1200 proceeds to operation 1220. The method 1200 can end at operation 1220.

Returning to operation 1208, if the device gateway 120 determines that the device serial number is invalid, the method 1200 proceeds to operation 1222. Likewise, if, at operation 1211, the device gateway 120 determines that the asset serial number is invalid, the method 1200 proceeds to operation 1222. At operation 1222, the method 1200 fails and proceeds to operation 1220. The method 1200 can end at operation 1220.

Figure 13:
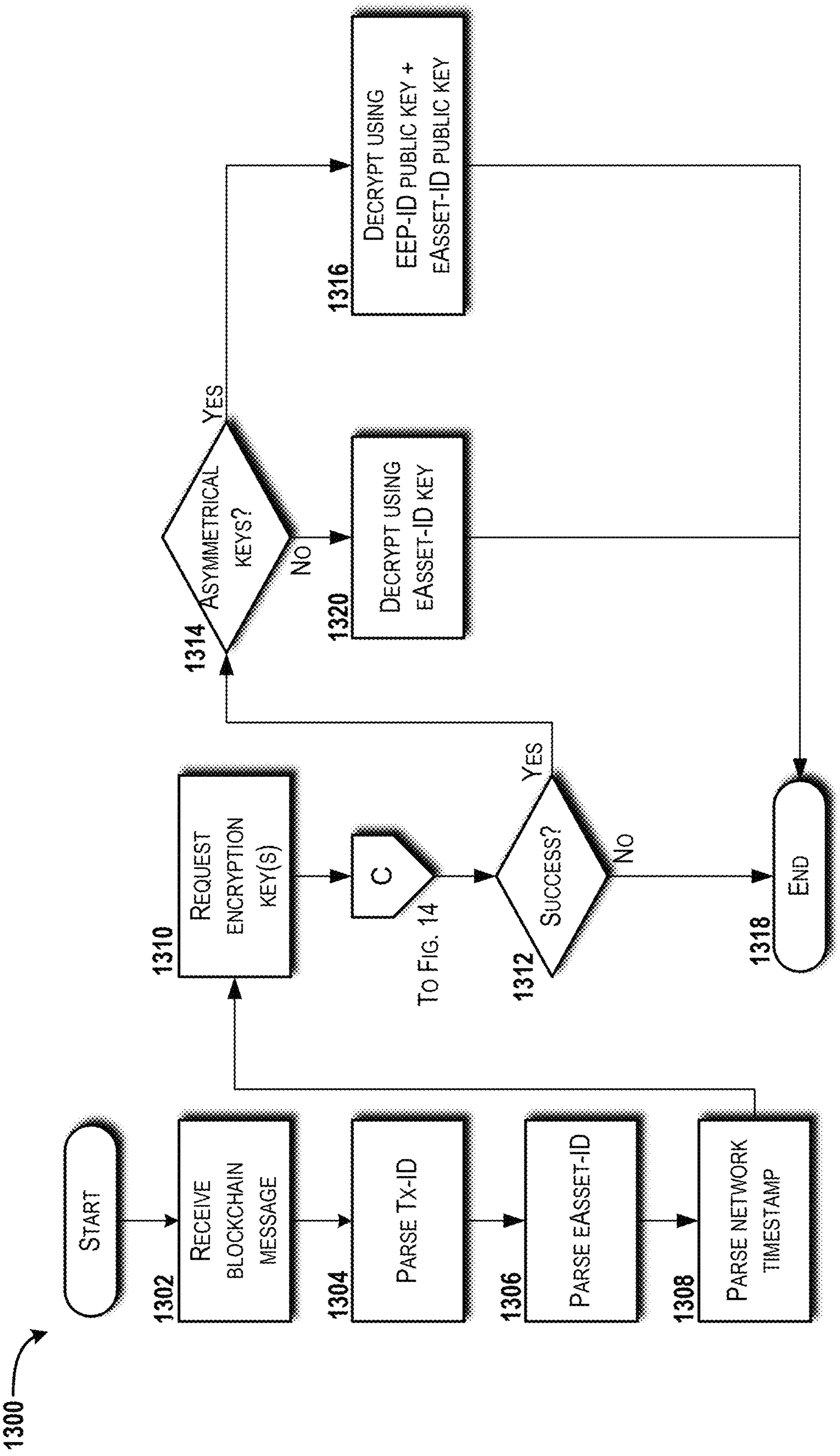
FIG. 13 is a flow diagram illustrating aspects of a method for decrypting public data from a public blockchain, according to an illustrative embodiment.

Turning now to FIG. 13, a method 1300 for decrypting public data from the public transaction pool 150 of the public blockchain 127 from the perspective of an EEP will be described, according to an illustrative embodiment. The method 1300 will be described from the perspective of the EEP embodied as the device gateway 120. Similar operations can be performed by the third party gateways 124.

The method 1300 begins and proceeds to operation 1302. At operation 1302, the device gateway 120 receives a blockchain message from the public transaction pool 150. From operation 1302, the method 1300 proceeds to operation 1304. At operation 1304, the device gateway 120 parses a blockchain transaction ID (e.g., the blockchain Tx-ID 152) from the blockchain message. From operation 1304, the method 1300 proceeds to operation 1306. At operation 1306, the device gateway 120 parses an eAsset-ID 154 associated with the device 102 or the asset 1502 served by the device gateway 120. From operation 1306, the method 1300 proceeds to operation 1308. At operation 1308, the device gateway 120 parses the network timestamp associated with the public data.

From operation 1308, the method 1300 proceeds to operation 1310. At operation 1310, the device gateway 120 requests the encryption keys 134 from the network gateway 116. From operation 1310, the method 1300 proceeds to a method 1400 described below with reference to FIG. 14, and in particular, operation 1402 of the method 1400. The method 1400 proceeds as described below and returns result indicating that the public data is restricted (fail state), a symmetrical key for the eAsset-ID 154, or asymmetrical keys for the EEP-ID and eAsset-ID 154.

Returning to operation 1312 of the method 1300, the device gateway 120 determines if the result of the method 1400 is successful (i.e., key(s) are returned). If so, the method 1300 proceeds to operation 1314. At operation 1314, the device gateway 120 determines if asymmetrical keys exist. If so, the method 1300 proceeds to operation 1316. At operation 1316, the device gateway 120 decrypts the public data using the EEP-ID public key and the eAsset-ID public key. From operation 1316, the method 1300 proceeds to operation 1318. The method 1300 can end at operation 1318.

Returning to operation 1312, if the device gateway 120 determines that the result of the method 1400 is unsuccessful (i.e., the public data is restricted), the method 1300 proceeds to operation 1318. The method 1300 can end at operation 1318.

Returning to operation 1314, if the device gateway 120 determines that asymmetrical keys do not exist, the method 1300 proceeds to operation 1320. At operation 1320, the device gateway 120 decrypts the public data using the eAsset-ID key. From operation 1320, the method 1300 proceeds to operation 1318. The method 1300 can end at operation 1318.

Figure 14:
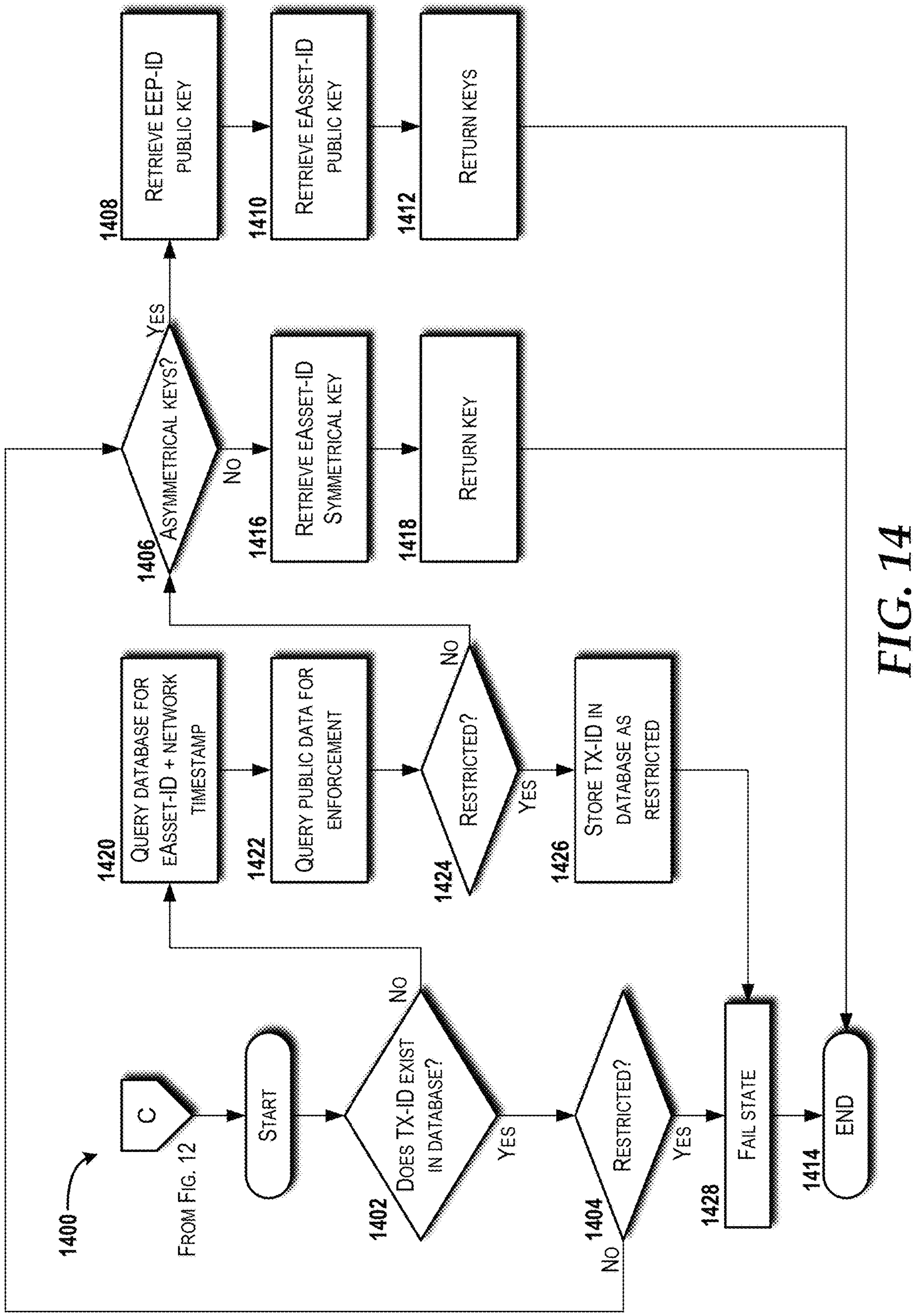
FIG. 14 is a flow diagram illustrating aspects of a method for retrieving a federation platform key for decryption of public data from a public blockchain, according to an illustrative embodiment.

Turning now to FIG. 14, a method 1400 for retrieving a federation platform key for decryption of public data from the public blockchain 127 will be described, according to an illustrative embodiment. The method 1400 is described from the perspective of the federation platform embodies as the network gateway 116.

The method 1400 begins and proceeds to operation 1402. At operation 1402, the network gateway 116 determines if the blockchain Tx-ID 152 associated with the blockchain message exists in the database. If so, the method 1400 proceeds to operation 1404. At operation 1404, the network gateway 116 determines if the blockchain Tx-ID 152 is restricted. If not, the method 1400 proceeds to operation 1406. At operation 1406, the network gateway 116 determines if asymmetrical keys exist. If so, the method 1400 proceeds to operation 1408. At operation 1408, the network gateway 116 retrieves the EEP-ID public key. From operation 1408, the method 1400 proceeds to operation 1410. At operation 1410, the network gateway 116 retrieves the eAsset-ID public key. From operation 1410, the method 1400 proceeds to operation 1412. At operation 1412, the network gateway 116 returns the EEP-ID public key and the eAsset-ID public key to the device gateway 120. From operation 1412, the method 1400 proceeds to operation 1414. The method 1400 can end at operation 1414.

Returning to operation 1406, if the network gateway 116 determines that asymmetrical keys do not exist, the method 1400 proceeds to operation 1416. At operation 1416, the network gateway 116 retrieves the eAsset-ID symmetrical key. From operation 1416, the method 1400 proceeds to operation 1418. At operation 1418, the network gateway 116 returns the eAsset-ID symmetrical key. From operation 1418, the method 1400 proceeds to operation 1414. The method 1400 can end at operation 1414.

Returning to operation 1402, if the network gateway 116 determines that the blockchain Tx-ID 152 does not exist, the method 1400 proceeds to operation 1420. At operation 1420, the network gateway 116 queries a database (not shown) of blockchain Tx-IDs 152 for the eAsset-ID 154 and a network timestamp. The database can include the blockchain Tx-IDs 152 that have been queried and are known to be restricted. It should be noted that the first time the network gateway 116 receives a query for a particular blockchain Tx-ID 152, the method 1400 flow proceeds from operation 1402, to operation 1420, and then to operation 1428. The second time the network gateway 116 receives a query for the same blockchain Tx-ID 152, the method 1400 flow proceeds from operation 1402, to operation 1404, and then to operation 1428. As such, the database serves as a time-saving, processor-saving cache that can be treated generically as a database of known blockchain Tx-IDs 152 that are in the public blockchain 127 and are restricted.

From operation 1420, the method 1400 proceeds to operation 1422. At operation 1422, the network gateway 116 queries for the public data for enforcement. From operation 1422, the method 1400 proceeds to operation 1424. At operation 1424, the network gateway 116 determines if the public data is restricted. If not, the method 1400 proceeds to operation 1406 and the method 1400 proceeds as described above. If, however, the network gateway 116 determines that the public data is restricted, the method 1400 proceeds to operation 1426. At operation 1426, the network gateway 116 stores the blockchain Tx-ID 152 in the database as restricted. The method 1400 then proceeds to operation 1428 and the method 1400 fails. Returning to operation 1404, if the blockchain Tx-ID 152 is determined to be restricted, then the method 1400 proceeds to operation 1428. From operation 1428, the method 1400 proceeds to operation 1414. The method 1400 can end at operation 1414.

Turning now to FIG. 15, a block diagram illustrating aspects of a combination data source device 1500 (i.e., device+asset) that combines an asset 1502 and an IoT device 1504 (e.g., the device 102) will be described, according to an illustrative embodiment. The asset 1502 can be any "thing" that is to be tracked and/or monitored. The asset 1502 is flexible and can support n-number of sensor combinations to monitor one or more parameters associated with the asset 1502. The asset 1502 is in communication with a programmable IoT device (referred to herein for simplicity as the "device") 1504 via an asset-to-device bus 1506. The embodiments described herein focus on a single device 1504. The device 1504 is flexible and can support n-number of sensor combinations to monitor one or more parameters associated with the asset 1502. The parameter(s) to be monitored can be any parameter of the asset 1502 and/or the device 1504 that is/are capable of being monitored by one or more sensors. The sensors can be off-the-shelf sensors or custom sensors built to monitor a specific one or more parameters associated with the asset 1502. As such, the concepts and technologies disclosed herein are not limited to any particular set of parameters to be monitored. By way of example, however, the parameters can be environmental parameters such as temperature or humidity of the asset 1502; security parameters such as when a door open/close events; or geographical/location parameters such as latitude and longitude coordinates.

The asset-to-device bus 1506 can enable bi-directional communication between the asset 1502 and the device 1504. More particularly, the device 1504 can communicate with a sensor hub 1508 of the asset 1502 to obtain sensor data from any number of asset sensors 1510A-1510N (hereinafter referred to individually as "asset sensor 1510," or collectively as "asset sensors 1510"). The asset sensors 1510 can be associated with the asset 1502 (e.g., installed, attached, or otherwise implemented) so as to monitor different aspects of the asset 1502. The asset sensor(s) 1510, in some embodiments, is/are associated with the asset 1502 as the asset 1502 moves through a supply chain, such as, for example, from manufacturing (or harvesting, mining, or other method of creation or procurement) to warehousing to fleet/shipping and finally to retail or another link in the supply chain. The supply chain may be populated by the various owners of the data collected by the asset 1502 and/or the device 1504 to be sent in the data message 104. In this manner, the asset sensors 1510 can include sensors that monitor/track data that is common among the different verticals in the supply chain. For example, the asset sensors 1510 may include a temperature sensor and/or humidity sensor configured to measure the temperature and/or humidity of the asset 1502 itself or an environment in which the asset 1502 is located.

The asset-to-device bus 1506 can be or can include any interface over which data can be shared between the sensor hub 1508 and the device 1504. The asset-to-device bus 1506, in some embodiments, also can provide power to the sensor hub 1508 in sufficient capacity to enable operation of the asset sensors 1510. Although a power supply is not illustrated, AC and DC power supplies are contemplated, including mains and battery-based implementations. The asset-to-device bus 1506 can be implemented as a wired, wireless, or combined wired/wireless interface. The asset-to-device bus 1506 can utilize any standardized interface such as, but no limited to, serial bus, universal serial bus ("USB"), serial ATA ("SATA"), eSATA, BLUETOOTH, IEEE 1494 ("FIREWIRE"), serial peripheral interface ("SPI"), inter-integrated circuit ("I2C"), WIFI, combinations thereof, and the like. The asset-to-device bus 1506 alternatively can utilize a proprietary interface.

The asset-to-device bus 1506 can be an extension of a device bus 1512 associated with the device 1504. The device bus 1512 can enable communication between components of the device 1504, including a controller 1514, a network module 1516, and any number of device sensors 1518A-1518N (hereinafter referred to individually as "device sensor 1518," or collectively as "device sensors 1518"), and with the sensor hub 1508 that terminates the asset-to-device bus 1506. This allows sensors external to the device 1504, such as the asset sensors 1510 connected to the sensor hub 1508, to be viewed by the device 1504, and more specifically, the controller 1514 of the device 1504, as internal sensors similar to the device sensors 1518. In this manner, the device 1504 can provide additional monitoring/tracking functionality to the asset 1502. Moreover, as noted above, the asset sensors 1510 can be powered by the device 1504 similar to the device sensors 1518 and other components of the device 1504.

The sensor hub 1508 is extensible so that n-number of sensors can be attached externally to the device 1504. The sensor hub 1508 can be associated with an electronic identifier (shown as "asset ID 1520"). The asset ID 1520 is a unique identifier to uniquely identify the asset 1502 among a plurality of other assets (not shown). The format of the asset ID 1520 can include any combination of letters, numbers, symbols, and/or other characters. The asset ID 1520 can be or can include a serial number (or other identifier) associated with the asset 1502. The asset ID 1520 can be in a standardized format or a proprietary format.

The asset sensors 1510 and the device sensors 1518 can be any sensor types. By way of example, and not limitation, the asset sensors 1510 and the device sensors 1518 can be or can include acceleration sensors, acoustic sensors, advanced sensors, alkalinity sensors, ambient sensors, angle sensors, auditory sensors, automation sensors, automotive sensors, barometric sensors, bio sensors, chemical sensors, control sensors, density sensors, depth sensors, directional sensors, displacement sensors, distance sensors, door sensors, electric current sensors, electric potential sensors, flow sensors, fluid sensors, fluid velocity sensors, force sensors, gas sensors, glass sensors, global positioning system ("GPS") sensors, heat sensors, humidity sensors, imaging sensors, industrial sensors, infrared sensors, interface sensors, ionizing sensors, laser sensors, level sensors, light sensors, liquid sensors, magnetic sensors, manufacturing sensors, navigation sensors, optical sensors, pH Sensors, photon sensors, polar sensors, position sensors, pressure sensors, proximity sensors, radar sensors, radiation sensors, radio sensors, shock sensors, smoke sensors, sound sensors, speed sensors, temperature sensors, thermal sensors, ultrasonic sensors, velocity sensors, vibration sensors, yaw sensors, any combinations thereof, and the like. Some examples disclosed herein focus on sensor types such as temperature and humidity sensors. It should be understood that these examples are merely exemplary and should not be construed as being limiting in any way.

The controller 1514 can control at least some of the functions of the device 1504. The controller 1514 can include one or more processors, which can be operatively linked and in communication with one or more memory components. The processor(s) can execute computer-executable instructions stored in the memory component(s). Execution of the computer-executable instructions can cause the controller 1514 to perform various functions described herein. In some embodiments, the controller 1514 is designed as an integrated circuit, such as a microcontroller, system-on-a-chip, or the like, that includes the processor(s), memory component(s), and input/output components (e.g., the asset-to-device bus 1506 and/or the device bus 1512). In some embodiments, the network module 1516 can be implemented as part of the controller 1514. Those skilled in the art will appreciate the numerous designs suitable for the device 1504 to effectively provide the functionality described herein. Although components of the device 1504 are shown separately in the illustrated embodiment, integration of two or more of these components is contemplated and may be beneficial for some implementations. As such, the illustrated example and other examples described herein for the design of the device 1504 should not be construed as being limiting in any way.

The device 1504 can be associated with a device ID 1522. The device ID 1522 can be a device serial number or other identifier that uniquely identifies the device 1504. In the illustrated example, the device ID 1522 is shown as being stored in the controller 1514 (e.g., in a memory component thereof). The device ID 1522 may be stored elsewhere such as, for example, a dedicated memory component that may provide additional security to avoid spoofing or other tampering with the device 1504.

The network module 1516 can be operatively linked and in communication with one or more communications networks (best shown in FIG. 8). The network module 1516 can be or can include a wireless network interface. The network module 1516 can be used to communicate with other devices and/or networks (not shown). In some embodiments, the network module 1516 includes or is otherwise in communication with a subscriber identity module ("SIM") system (not shown). The SIM system can include a universal SIM ("USIM"), a universal integrated circuit card ("UICC"), and/or other identity devices that can be uniquely identified by a SIM ICCID 1524. The SIM system can include and/or can be connected to or inserted into an interface such as a slot interface. In some embodiments, the interface can be configured to accept insertion of other identity cards or modules for accessing various types of networks. Additionally, or alternatively, the interface can be configured to accept multiple subscriber identity cards. The network module 1516 can be associated with its own unique identifier shown as a network module ID 1526. Because other devices and/or modules for identifying users, owners, and/or the device 1504 are contemplated, it should be understood that these embodiments are illustrative, and should not be construed as being limiting in any way.

Figure 16:
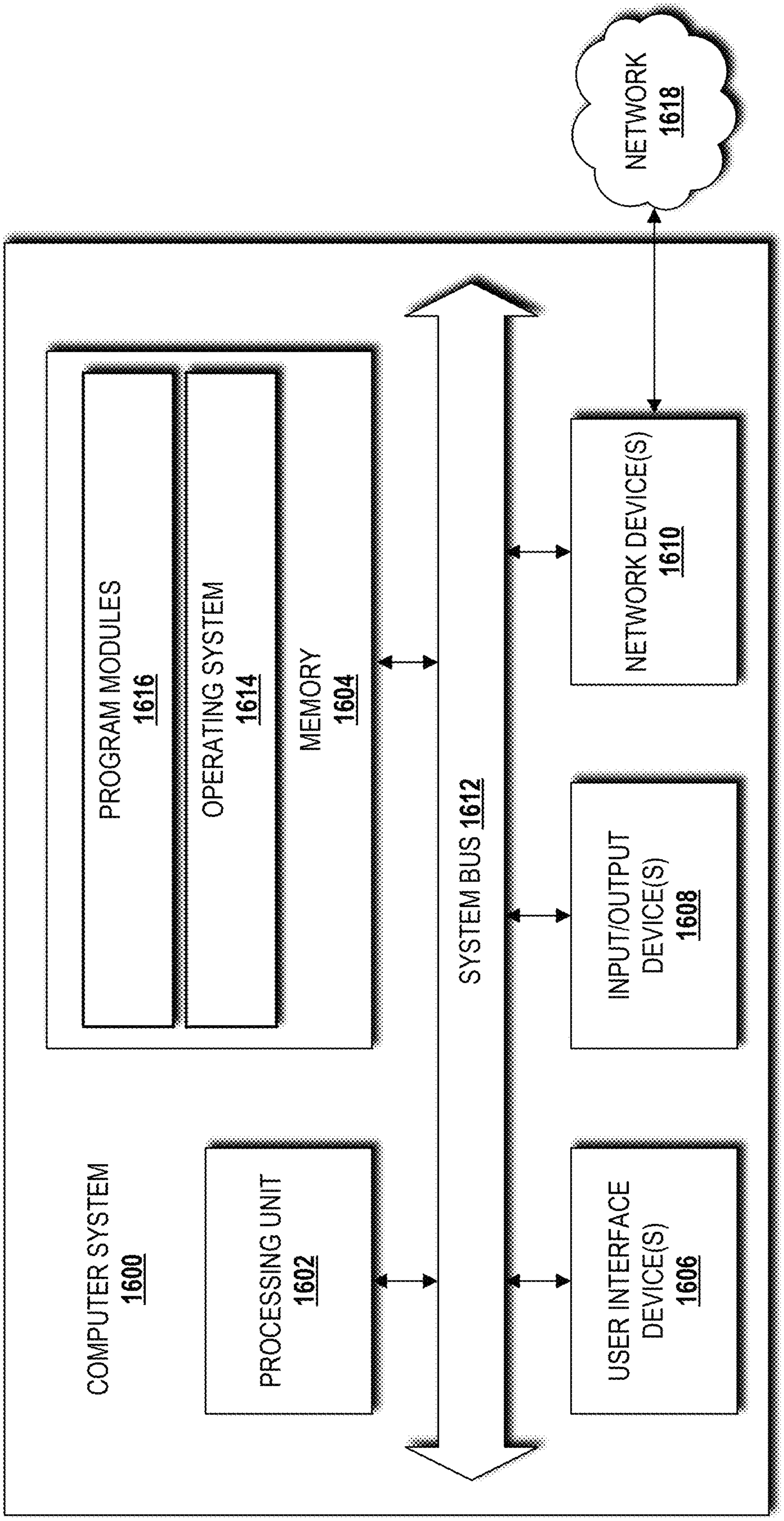
FIG. 16 is a block diagram illustrating an example computer system that can be used to implement aspects of the concepts and technologies disclosed herein, according to an illustrative embodiment.

Turning now to FIG. 16, a block diagram illustrating a computer system 1600 configured to provide the functionality described herein in accordance with various embodiments of the concepts and technologies disclosed herein. In some embodiments, the data source device 102, the network gateway 116, the device gateway 120, the party$_1$ gateway 124A, and/or the party$_n$ gateway 124N can be configured like and/or can have an architecture similar or identical to the computer system 1600 described herein with respect to FIG. 16. It should be understood, however, that any of these systems, devices, or elements may or may not include the functionality described herein with reference to FIG. 16.

The computer system 1600 includes a processing unit 1602, a memory 1604, one or more user interface devices 1606, one or more input/output ("I/O") devices 1608, and one or more network devices 1610, each of which is operatively connected to a system bus 1612. The bus 1612 enables bi-directional communication between the processing unit 1602, the memory 1604, the user interface devices 1606, the I/O devices 1608, and the network devices 1610.

The processing unit 1602 may be a standard central processor that performs arithmetic and logical operations, a more specific purpose programmable logic controller ("PLC"), a programmable gate array, or other type of processor known to those skilled in the art and suitable for controlling the operation of the computer system 1600.

The memory 1604 communicates with the processing unit 1602 via the system bus 1612. In some embodiments, the memory 1604 is operatively connected to a memory controller (not shown) that enables communication with the processing unit 1602 via the system bus 1612. The memory 1604 includes an operating system 1614 and one or more program modules 1616. The operating system 1614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1616 may include various software and/or program modules described herein. By way of example, and not limitation, computer-readable media may include any available computer storage media or communication media that can be accessed by the computer system 1600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1600. In the claims, the phrase "computer storage medium," "computer-readable storage medium," and variations thereof does not include waves or signals per se and/or communication media, and therefore should be construed as being directed to "non-transitory" media only.

The user interface devices 1606 may include one or more devices with which a user accesses the computer system 1600. The user interface devices 1606 may include, but are not limited to, computers, servers, personal digital assistants, cellular phones, or any suitable computing devices. The I/O devices 1608 enable a user to interface with the program modules 1616. In one embodiment, the I/O devices 1608 are operatively connected to an I/O controller (not shown) that enables communication with the processing unit 1602 via the system bus 1612. The I/O devices 1608 may include one or more input devices, such as, but not limited to, a keyboard, a mouse, or an electronic stylus. Further, the I/O devices 1608 may include one or more output devices, such as, but not limited to, a display screen or a printer to output data.

The network devices 1610 enable the computer system 1600 to communicate with other networks or remote systems via one or more networks, such as a network 1618. Examples of the network devices 1610 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such as a WiMAX network, or a cellular network. Alternatively, the network(s) may be a wired network such as, but not limited to, a WAN such as the Internet, a LAN, a wired PAN, or a wired MAN.

Figure 17:
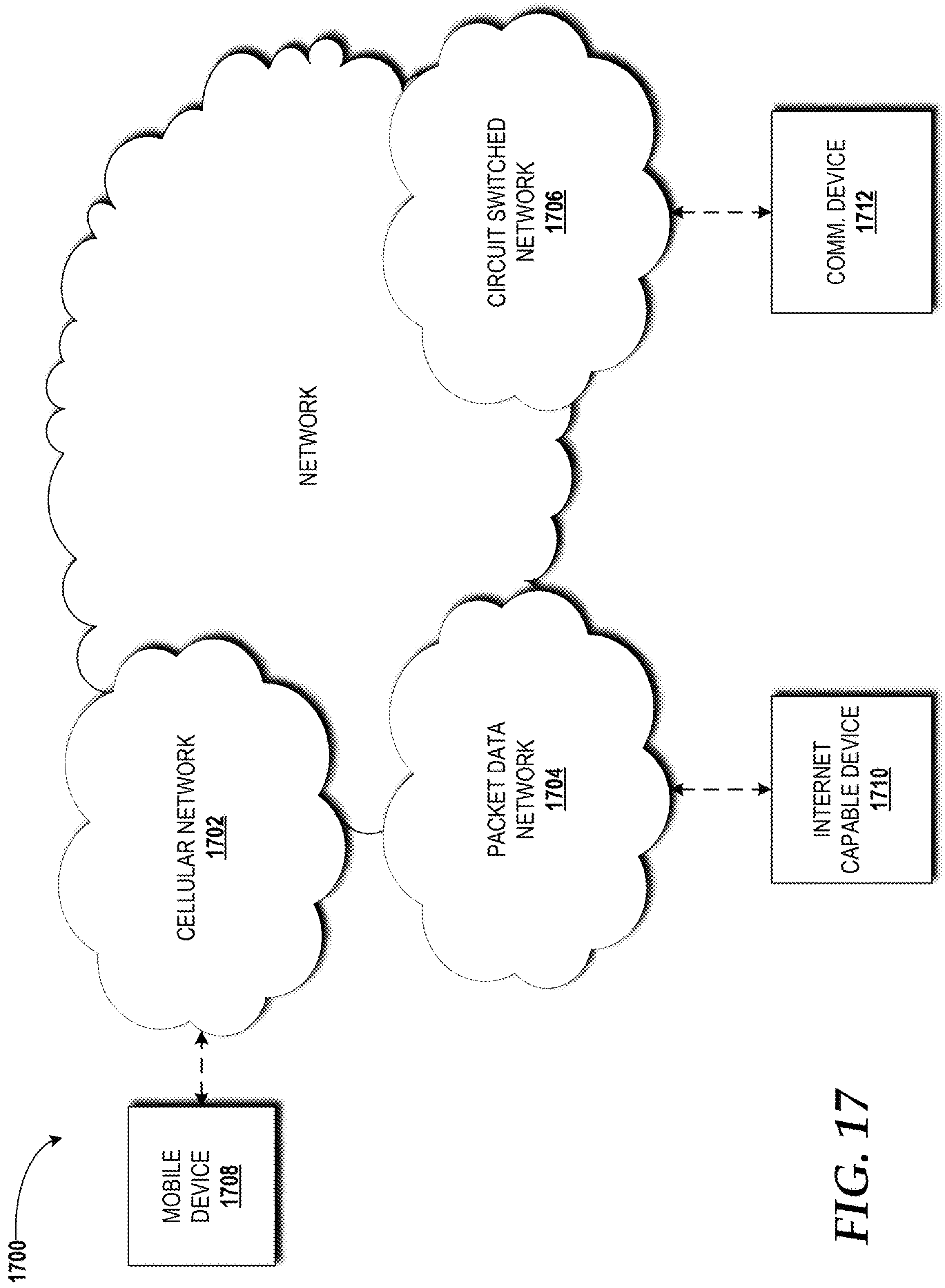
FIG. 17 is a block diagram illustrating a network that can be used to implement aspects of the concepts and technologies disclosed herein, according to an illustrative embodiment.

Turning now to FIG. 17, a network 1700 is illustrated, according to an illustrative embodiment. Communications among the data source device 102, the network gateway 116, the device gateway 120, the $party_1$ gateway 124A, and the $party_n$ gateway 124N can be handled over the network 1700, and in particular, a cellular network 1702 (e.g., mobile network), a packet data network 1704, for example, the Internet, and a circuit switched network 1706, for example, a publicly switched telephone network ("PSTN"). The cellular network 1702 includes various components such as, but not limited to, base transceiver stations ("BTSs"), Node-B's, e-Node-B's, g-Node-B's base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1702 also includes radios and nodes for receiving and transmitting voice, data, and combinations thereof to and from radio transceivers, networks, the packet data network 1704, and the circuit switched network 1706.

A mobile communications device 1706, such as, for example, the data source device 102, the network gateway 116, the device gateway 120, the $party_1$ gateway 124A, and/or the $party_N$ gateway 124N, a cellular telephone, a user equipment, a mobile terminal, a PDA, a laptop computer, a handheld computer, and combinations thereof, can be operatively connected to the cellular network 1702. The mobile communications device 1706 can be operatively connected to the cellular network 1702. The cellular network 1702 can be configured as a 2G GSM network and can provide data communications via GPRS and/or EDGE. Additionally, or alternatively, the cellular network 1702 can be configured as a 3G UMTS network and can provide data communications via the HSPA protocol family, for example, HSDPA, EUL (also referred to as HSUPA), and HSPA+. The cellular network 1702 also is compatible with 4G mobile communications standards as well as evolved and future mobile standards.

The packet data network 1704 includes various devices, for example, the data source device 102, the network gateway 116, the device gateway 120, the $party_1$ gateway 124A, and/or the $party_n$ gateway 124N, servers, computers, databases (e.g., the network database 118, the device database 122, the $party_1$ database 126A, and/or the $party_N$ database 126N), and other devices in communication with one another, as is generally known. The packet data network 1704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1704 includes or is in communication with the Internet.

The circuit switched network 1706 includes various hardware and software for providing circuit switched communications. The circuit switched network 1706 may include, or may be, what is often referred to as a plain old telephone system ("POTS"). The functionality of a circuit switched network 1706 or other circuit-switched network are generally known and will not be described herein in detail.

The illustrated cellular network 1702 is shown in communication with the packet data network 1704 and a circuit switched network 1706, though it should be appreciated that this is not necessarily the case. One or more Internet-capable devices 1710, for example, the data source device 102, the network gateway 117, the device gateway 120, the party$_1$ gateway 124A, and/or the party$_n$ gateway 124N, a personal computer ("PC"), a laptop, a portable device, or another suitable device, can communicate with one or more cellular networks 1702, and devices connected thereto, through the packet data network 1704. It also should be appreciated that the Internet-capable device 1710 can communicate with the packet data network 1704 through the circuit switched network 1706, the cellular network 1702, and/or via other networks (not illustrated).

As illustrated, a communications device 1712, for example, a telephone, facsimile machine, modem, computer, or the like, can be in communication with the circuit switched network 1706, and therethrough to the packet data network 1704 and/or the cellular network 1702. It should be appreciated that the communications device 1712 can be an Internet-capable device, and can be substantially similar to the Internet-capable device 1710.

Figure 18:
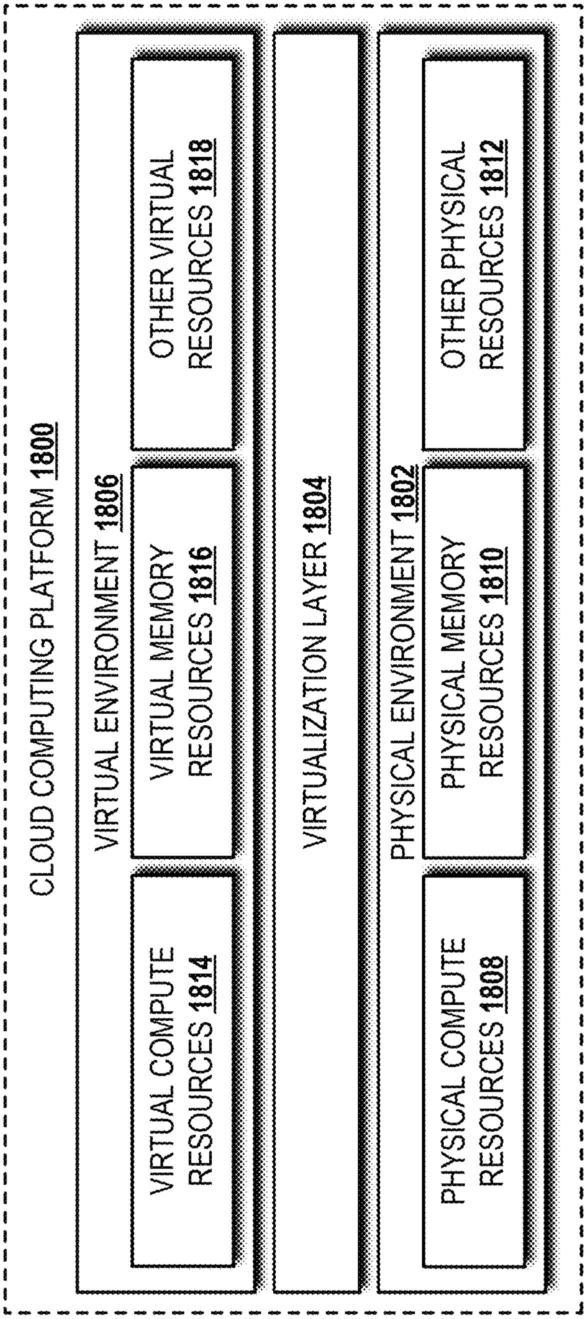
FIG. 18 is a block diagram illustrating an example cloud computing platform that can be used to implement aspects of the concepts and technologies disclosed herein, according to an illustrative embodiment.

Turning now to FIG. 18, an illustrative cloud computing platform 1800 will be described, according to an illustrative embodiment. The data source device 102, the network gateway 116, the device gateway 120, the party$_1$ gateway 124A, and/or the party$_n$ gateway 124N, and/or other networks, systems, and/or devices disclosed herein can be implemented and/or controlled, at least in part, in/by the cloud computing platform 1800.

The cloud computing platform 1800 includes a physical environment 1802, a virtualization layer 1804, and a virtual environment 1806. While no connections are shown in FIG. 18, it should be understood that some, none, or all of the components illustrated in FIG. 18 can be configured to interact with one other to carry out various functions described herein. In some embodiments, the components are arranged so as to communicate via one or more networks. Thus, it should be understood that FIG. 18 and the remaining description are intended to provide a general understanding of a suitable environment in which various aspects of the embodiments described herein can be implemented, and should not be construed as being limiting in any way.

The physical environment 1802 provides hardware resources that, in the illustrated embodiment, include one or more physical compute resources 1808, one or more physical memory resources 1810, and one or more other physical resources 1812.

The physical compute resource(s) 1808 can include one or more hardware components that perform computations to process data and/or to execute computer-executable instructions of one or more application programs, one or more operating systems, and/or other software. The physical compute resources 1808 can include one or more central processing units ("CPUs") configured with one or more processing cores. The physical compute resources 1808 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1808 can include one or more discrete GPUs. In some other embodiments, the physical compute resources 1808 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1808 can include one or more system-on-chip ("SoC") components along with one or more other components, including, for example, one or more of the physical memory resources 1810, and/or one or more of the other physical resources 1812. In some embodiments, the physical compute resources 1808 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The physical compute resources 1808 can be or can include one or more hardware components architected in accordance with an ARM architecture, available for license from ARM HOLDINGS of Cambridge, United Kingdom. Alternatively, the physical compute resources 1808 can be or can include one or more hardware components architected in accordance with an x86 architecture, such an architecture available from INTEL CORPORATION of Mountain View, California, and others. Those skilled in the art will appreciate the implementation of the physical compute resources 1808 can utilize various computation architectures, and as such, the physical compute resources 1808 should not be construed as being limited to any particular computation architecture or combination of computation architectures, including those explicitly disclosed herein.

The physical memory resource(s) 1810 can include one or more hardware components that perform storage/memory operations, including temporary or permanent storage operations. In some embodiments, the physical memory resource(s) 1810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1808.

The other physical resource(s) 1812 can include any other hardware resources that can be utilized by the physical compute resources(s) 1808 and/or the physical memory resource(s) 1810 to perform operations described herein. The other physical resource(s) 1812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1802 can be virtualized by one or more virtual machine monitors (not shown; also known as "hypervisors") operating within the virtualization/control layer 1804 to create virtual resources that reside in the virtual environment 1806. The virtual machine monitors can be or can include software, firmware, and/or hardware that alone or in combination with other software, firmware, and/or hardware, creates and manages virtual resources operating within the virtual environment 1806.

The virtual resources operating within the virtual environment 1806 can include abstractions of at least a portion of the physical compute resources 1808, the physical memory resources 1810, and/or the other physical resources 1812, or any combination thereof, shown as virtual compute resources 1814, virtual memory resources 1816, and other virtual resources 1818, respectively. In some embodiments, the abstractions can include one or more virtual machines upon which one or more applications can be executed.

Figure 19:
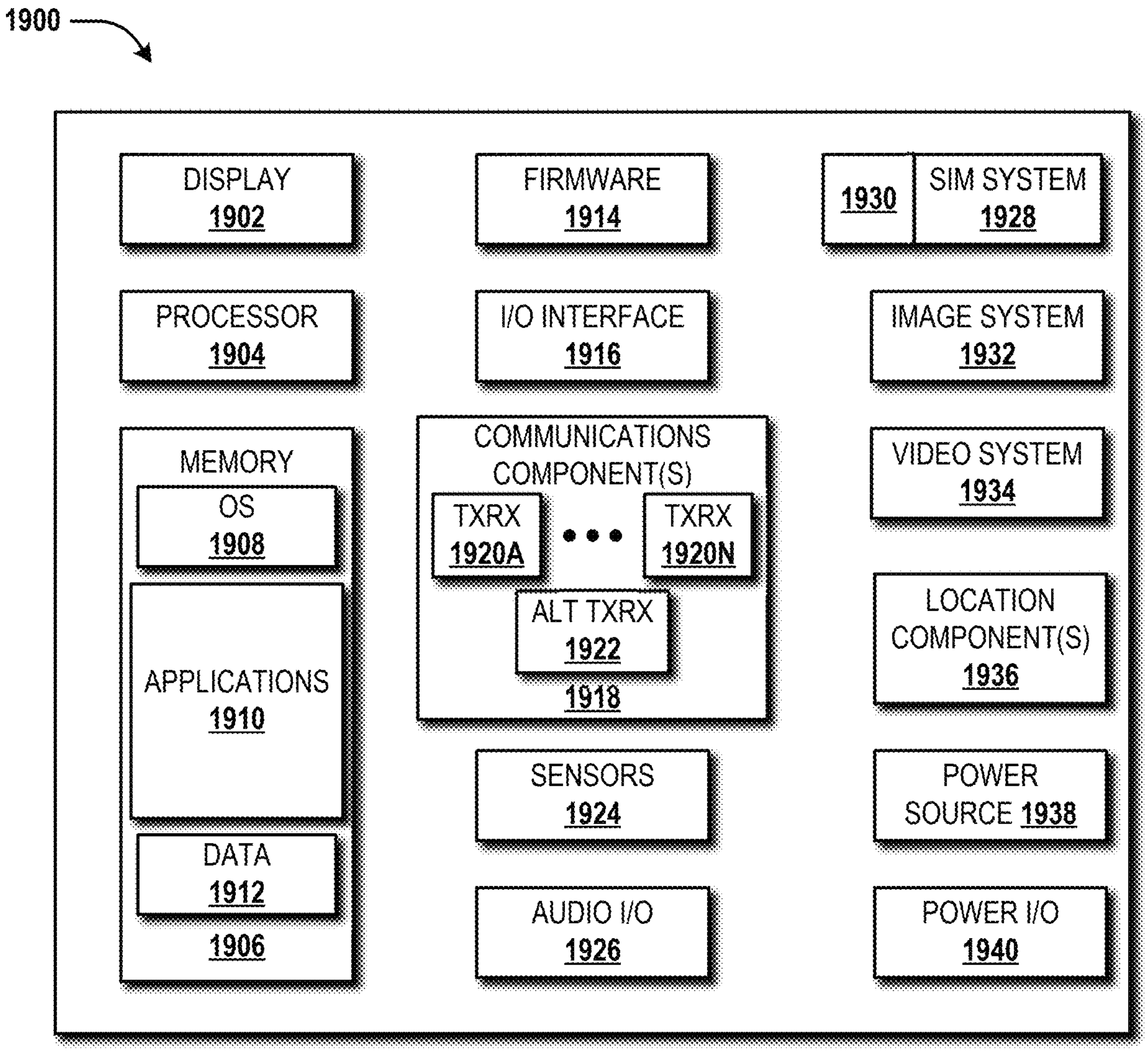
FIG. 19 is a block diagram illustrating an example mobile device and components thereof, according to an illustrative embodiment.

Turning now to FIG. 19, an illustrative mobile device 1900 and components thereof will be described. In some embodiments, the data source device 102, the network gateway 116, the device gateway 120, the $party_1$ gateway 124A, and/or the $party_n$ gateway 124N described above can be configured as and/or can have an architecture similar or identical to the mobile device 1900 described herein in FIG. 19. While connections are not shown between the various components illustrated in FIG. 19, it should be understood that some, none, or all of the components illustrated in FIG. 19 can be configured to interact with one another to carry out various device functions. In some embodiments, the components are arranged so as to communicate via one or more busses (not shown). Thus, it should be understood that FIG. 19 and the following description are intended to provide a general understanding of a suitable environment in which various aspects of embodiments can be implemented, and should not be construed as being limiting in any way.

As illustrated in FIG. 19, the mobile device 1900 can include a display 1902 for displaying data. According to various embodiments, the display 1902 can be configured to display data described herein, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 1900 also can include a processor 1904 and a memory or other data storage device ("memory") 1906. The processor 1904 can be configured to process data and/or can execute computer-executable instructions stored in the memory 1906. The computer-executable instructions executed by the processor 1904 can include, for example, an operating system 1908, one or more applications 1910, other computer-executable instructions stored in the memory 1906, or the like. In some embodiments, the applications 1910 also can include a UI application (not illustrated in FIG. 19).

The UI application can interface with the operating system 1908 to facilitate user interaction with functionality and/or data stored at the mobile device 1900 and/or stored elsewhere. In some embodiments, the operating system 1908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1904 to aid a user in data communications, entering/deleting data, entering and setting user IDs and passwords for device access, configuring settings, manipulating content and/or settings, multimode interaction, interacting with other applications 1910, and otherwise facilitating user interaction with the operating system 1908, the applications 1910, and/or other types or instances of data 1912 that can be stored at the mobile device 1900.

The applications 1910, the data 1912, and/or portions thereof can be stored in the memory 1906 and/or in a firmware 1914, and can be executed by the processor 1904. The firmware 1914 also can store code for execution during device power up and power down operations. It can be appreciated that the firmware 1914 can be stored in a volatile or non-volatile data storage device including, but not limited to, the memory 1906 and/or a portion thereof.

The mobile device 1900 also can include an input/output ("I/O") interface 1916. The I/O interface 1916 can be configured to support the input/output of data such as location information, presence status information, user IDs, passwords, and application initiation (start-up) requests. In some embodiments, the I/O interface 1916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1900 can be configured to synchronize with another device to transfer content to and/or from the mobile device 1900. In some embodiments, the mobile device 1900 can be configured to receive updates to one or more of the applications 1910 via the I/O interface 1916, though this is not necessarily the case. In some embodiments, the I/O interface 1916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1916 may be used for communications between the mobile device 1900 and a network device or local device.

The mobile device 1900 also can include a communications component 1918. The communications component 1918 can be configured to interface with the processor 1904 to facilitate wired and/or wireless communications with one or more networks. In some embodiments, the communications component 1918 includes a multimode communications subsystem for facilitating communications via the cellular network and one or more other networks.

The communications component 1918, in some embodiments, includes one or more transceivers. The one or more transceivers, if included, can be configured to communicate over the same and/or different wireless technology standards with respect to one another. For example, in some embodiments, one or more of the transceivers of the communications component 1918 may be configured to communicate using GSM, CDMAONE, CDMA2000, LTE, and various other 2G, 2.5G, 3G, 4G, 4.5G, 5G, and greater generation technology standards. Moreover, the communications component 1918 may facilitate communications over various channel access methods (which may or may not be used by the aforementioned standards) including, but not limited to, TDMA, FDMA, W-CDMA, OFDM, SDMA, and the like.

In addition, the communications component 1918 may facilitate data communications using GPRS, EDGE, the HSPA protocol family including HSDPA, EUL or otherwise termed HSUPA, HSPA+, and various other current and future wireless data access standards. In the illustrated embodiment, the communications component 1918 can include a first transceiver ("TxRx") 1920A that can operate in a first communications mode (e.g., GSM). The communications component 1918 also can include an Nth transceiver ("TxRx") 1920N that can operate in a second communications mode relative to the first transceiver 1920A (e.g., UMTS). While two transceivers 1920A-1920N (hereinafter collectively and/or generically referred to as "transceivers 1920") are shown in FIG. 19, it should be appreciated that less than two, two, and/or more than two transceivers 1920 can be included in the communications component 1918.

The communications component 1918 also can include an alternative transceiver ("Alt TxRx") 1922 for supporting other types and/or standards of communications. According to various contemplated embodiments, the alternative transceiver 1922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1918 also can facilitate reception from terrestrial radio networks, digital satellite radio networks, internet-based radio service networks, combinations thereof, and the like. The communications component 1918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1900 also can include one or more sensors 1924. The sensors 1924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1900 may be provided by an audio I/O component 1926. The audio I/O component 1926 of the mobile device 1900 can include one or more speakers for the output of audio signals, one or more microphones for the collection and/or input of audio signals, and/or other audio input and/or output devices.

The illustrated mobile device 1900 also can include a subscriber identity module ("SIM") system 1928. The SIM system 1928 can include a universal SIM ("USIM"), a universal integrated circuit card ("UICC") and/or other identity devices. The SIM system 1928 can include and/or can be connected to or inserted into an interface such as a slot interface 1930. In some embodiments, the slot interface 1930 can be configured to accept insertion of other identity cards or modules for accessing various types of networks. Additionally, or alternatively, the slot interface 1930 can be configured to accept multiple subscriber identity cards. Because other devices and/or modules for identifying users and/or the mobile device 1900 are contemplated, it should be understood that these embodiments are illustrative, and should not be construed as being limiting in any way.

The mobile device 1900 also can include an image capture and processing system 1932 ("image system"). The image system 1932 can be configured to capture or otherwise obtain photos, videos, and/or other visual information. As such, the image system 1932 can include cameras, lenses, charge-coupled devices ("CCDs"), combinations thereof, or the like. The mobile device 1900 may also include a video system 1934. The video system 1934 can be configured to capture, process, record, modify, and/or store video content. Photos and videos obtained using the image system 1932 and the video system 1934, respectively, may be added as message content to an MMS message, email message, and sent to another device. The video and/or photo content also can be shared with other devices via various types of data transfers via wired and/or wireless communication devices as described herein.

The mobile device 1900 also can include one or more location components 1936. The location components 1936 can be configured to send and/or receive signals to determine a geographic location of the mobile device 1900. According to various embodiments, the location components 1936 can send and/or receive signals from global positioning system ("GPS") devices, assisted-GPS ("A-GPS") devices, WI-FI/WIMAX and/or cellular network triangulation data, combinations thereof, and the like. The location component 1936 also can be configured to communicate with the communications component 1918 to retrieve triangulation data for determining a location of the mobile device 1900. In some embodiments, the location component 1936 can interface with cellular network nodes, telephone lines, satellites, location transmitters and/or beacons, wireless network transmitters and receivers, combinations thereof, and the like. In some embodiments, the location component 1936 can include and/or can communicate with one or more of the sensors 1924 such as a compass, an accelerometer, and/or a gyroscope to determine the orientation of the mobile device 1900. Using the location component 1936, the mobile device 1900 can generate and/or receive data to identify its geographic location, or to transmit data used by other devices to determine the location of the mobile device 1900. The location component 1936 may include multiple components for determining the location and/or orientation of the mobile device 1900.

The illustrated mobile device 1900 also can include a power source 1938. The power source 1938 can include one or more batteries, power supplies, power cells, and/or other power subsystems including alternating current ("AC") and/or direct current ("DC") power devices. The power source 1938 also can interface with an external power system or charging equipment via a power I/O component 1940. Because the mobile device 1900 can include additional and/or alternative components, the above embodiment should be understood as being illustrative of one possible operating environment for various embodiments of the concepts and technologies described herein. The described embodiment of the mobile device 1900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1900 or other devices or computers described herein, such as the computer system 1600 described above with reference to FIG. 16. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1900 in order to store and execute the software components presented herein. It is also contemplated that the mobile device 1900 may not include all of the components shown in FIG. 19, may include other components that are not explicitly shown in FIG. 19, or may utilize an architecture completely different than that shown in FIG. 19.

Based on the foregoing, it should be appreciated that aspects of time-aware blockchain staged regulatory control of IoT data have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

receiving, by a gateway comprising a processor, a valid enterprise edge platform identifier to provision the gateway to uniquely identify the gateway to a network gateway;

receiving, by the gateway, a network parameter of the network gateway to provision the gateway to communicate with the network gateway to register public data;

receiving, by the gateway, a service identifier to provision the gateway for a particular service;

receiving, by the gateway, a flag to register the gateway with the network gateway for cryptography, wherein the flag comprises one of a symmetrical flag to register the gateway with the network gateway for symmetrical cryptography or an asymmetrical flag to register the gateway with the network gateway for asymmetrical cryptography;

generating, by the gateway, a registration request based upon at least one of the valid enterprise edge platform identifier, the network parameter, the service identifier, and the flag;

sending, by the gateway, the registration request to the network gateway;

receiving, by the gateway, from the network gateway, a registration response;

determining, by the gateway, whether the registration response indicates that registration with the network gateway was successful; and in response to determining that the registration response indicates that registration with the network gateway was unsuccessful, disabling the gateway for operation.

2. The method of claim 1, further comprising, in response to determining that the registration response indicates that registration with the network gateway was successful, determining whether the registration response comprises an asymmetrical key or a symmetrical key, wherein the asymmetrical key or the symmetrical key is based at least in part on the flag.

3. The method of claim 2, further comprising:

in response to determining that the registration response comprises an asymmetrical key, storing, by the gateway, the asymmetrical key for encryption; and enabling the gateway for operation using the asymmetrical key.

4. The method of claim 2, further comprising:

in response to determining that the registration response comprises a symmetrical key, storing, by the gateway, the symmetrical key for encryption; and enabling the gateway for operation using the symmetrical key.

5. The method of claim 1, wherein the gateway comprises a device gateway.

6. The method of claim 1, wherein the gateway comprises a third party gateway.

7. A gateway comprising:

a processor; and a memory comprising instructions that, when executed by the processor, cause the processor to perform operations comprising receiving a valid enterprise edge platform identifier to provision the gateway to uniquely identify the gateway to a network gateway, receiving a network parameter of the network gateway to provision the gateway to communicate with the network gateway to register public data, receiving a service identifier to provision the gateway for a particular service, receiving a flag to register the gateway with the network gateway for cryptography, wherein the flag comprises one of a symmetrical flag to register the gateway with the network gateway for symmetrical cryptography or an asymmetrical flag to register the gateway with the network gateway for asymmetrical cryptography, generating a registration request based upon at least one of the valid enterprise edge platform identifier, the network parameter, the service identifier, and the flag, sending the registration request to the network gateway, receiving, from the network gateway, a registration response, determining whether the registration response indicates that registration with the network gateway was successful, and in response to determining that the registration response indicates that registration with the network gateway was unsuccessful, disabling the gateway for operation.

8. The gateway of claim 7, wherein the operations further comprise in response to determining that the registration response indicates that registration with the network gateway was successful, determining whether the registration response comprises an asymmetrical key or a symmetrical key, wherein the asymmetrical key or the symmetrical key is based at least in part on the flag.

9. The gateway of claim 8, wherein the operations further comprise:

in response to determining that the registration response comprises an asymmetrical key, storing the asymmetrical key for encryption; and enabling the gateway for operation using the asymmetrical key.

10. The gateway of claim 8, wherein the operations further comprise:

in response to determining that the registration response comprises a symmetrical key, storing the symmetrical key for encryption; and enabling the gateway for operation using the symmetrical key.

11. A computer-readable storage medium comprising computer-executable instructions that, when executed by a processor a gateway, cause the processor to perform operations comprising:

receiving a valid enterprise edge platform identifier to provision the gateway to uniquely identify the gateway to a network gateway;

receiving a network parameter of the network gateway to provision the gateway to communicate with the network gateway to register public data;

receiving a service identifier to provision the gateway for a particular service;

receiving a flag to register the gateway with the network gateway for cryptography, wherein the flag comprises one of a symmetrical flag to register the gateway with the network gateway for symmetrical cryptography or an asymmetrical flag to register the gateway with the network gateway for asymmetrical cryptography;

generating a registration request based upon at least one of the valid enterprise edge platform identifier, the network parameter, the service identifier, and the flag;

sending the registration request to the network gateway;

receiving, from the network gateway, a registration response;

determining whether the registration response indicates that registration with the network gateway was successful;

in response to determining that the registration response indicates that registration with the network gateway was unsuccessful, disabling the gateway for operation.

12. The computer-readable storage medium of claim 11, wherein the operations further comprise in response to determining that the registration response indicates that registration with the network gateway was successful, determining whether the registration response comprises an asymmetrical key or a symmetrical key, wherein the asymmetrical key or the symmetrical key is based at least in part on the flag.

13. The computer-readable storage medium of claim 12, wherein the operations further comprise:

in response to determining that the registration response comprises an asymmetrical key, storing the asymmetrical key for encryption; and enabling the gateway for operation using the asymmetrical key.

14. The computer-readable storage medium of claim 12, wherein the operations further comprise:

in response to determining that the registration response comprises a symmetrical key, storing the symmetrical key for encryption; and enabling the gateway for operation using the symmetrical key.

* * * * *